US012372897B2

(12) United States Patent
Tajima et al.

(10) Patent No.: US 12,372,897 B2
(45) Date of Patent: Jul. 29, 2025

(54) IMAGE FORMING APPARATUS, IMAGE FORMING METHOD, AND PRINTED MATERIAL

(71) Applicants: Saki Tajima, Kanagawa (JP); Jun Hitosugi, Tokyo (JP); Kazumi Suzuki, Shizuoka (JP); Keiko Kajimura, Kanagawa (JP); Norio Kudoh, Kanagawa (JP); Shingo Hayashi, Kanagawa (JP); Kentaroh Kurosu, Kanagawa (JP); Masayuki Tsuchiya, Tokyo (JP)

(72) Inventors: Saki Tajima, Kanagawa (JP); Jun Hitosugi, Tokyo (JP); Kazumi Suzuki, Shizuoka (JP); Keiko Kajimura, Kanagawa (JP); Norio Kudoh, Kanagawa (JP); Shingo Hayashi, Kanagawa (JP); Kentaroh Kurosu, Kanagawa (JP); Masayuki Tsuchiya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/388,210

(22) Filed: Nov. 9, 2023

(65) Prior Publication Data

US 2024/0168406 A1 May 23, 2024

(30) Foreign Application Priority Data

Nov. 22, 2022 (JP) ................................ 2022-186561

(51) Int. Cl.
*G03G 15/06* (2006.01)
*G03G 15/00* (2006.01)
(Continued)

(52) U.S. Cl.
CPC ......... *G03G 15/087* (2013.01); *G03G 15/043* (2013.01); *G03G 15/556* (2013.01);
(Continued)

(58) Field of Classification Search
CPC ... G03G 15/043; G03G 15/087; G03G 15/556
(Continued)

(56) References Cited

U.S. PATENT DOCUMENTS 9,400,478 B2 * 7/2016 Mimura ................ G03G 21/08
2016/0139537 A1 5/2016 Kasai et al.
(Continued)

FOREIGN PATENT DOCUMENTS

JP 2007-017719 A 1/2007
JP 2019-015906 A 1/2019
JP 2020-042368 A 3/2020

OTHER PUBLICATIONS

Extended European Search Report issued Mar. 18, 2024 in European Patent Application No. 23201809.3, 7 pages.

*Primary Examiner* — Hoan H Tran
(74) *Attorney, Agent, or Firm* — XSENSUS LLP

(57) ABSTRACT

An image forming apparatus includes an image forming unit and developing containers. The image forming unit includes developing stations to form an image on a print medium with toners, based on input image data. The developing containers contain the toners and are attachable to and detachable from the developing stations. The developing containers include a first developing container containing a first toner and a second developing container containing a second toner having a higher luminescence intensity under invisible light than the first toner. The first toner and the second toner are toners that form an image having a higher luminescence intensity under the invisible light than under visible light. The image forming unit adheres the second toner to the print
(Continued)

medium before adhering the first toner when the image forming unit superimposes the first toner and the second toner one atop another on the print medium.

7 Claims, 18 Drawing Sheets

(51) Int. Cl.
*G03G 15/043* (2006.01)
*G03G 15/08* (2006.01)

(52) U.S. Cl.
CPC ............... *G03G 2215/0187* (2013.01); *G03G 2215/0624* (2013.01)

(58) Field of Classification Search
USPC .......................................................... 399/222
See application file for complete search history.

(56) References Cited

U.S. PATENT DOCUMENTS

| | | | |
|---|---|---|---|
| 2016/0147174 | A1 | 5/2016 | Yasuda et al. |
| 2016/0170321 | A1 | 6/2016 | Komori et al. |
| 2016/0313668 | A1 | 10/2016 | Kasai et al. |
| 2017/0199480 | A1 | 7/2017 | Morinaga et al. |
| 2020/0081669 | A1 | 3/2020 | Kunimi et al. |

* cited by examiner

IMAGE FORMING APPARATUS, IMAGE FORMING METHOD, AND PRINTED MATERIAL

CROSS-REFERENCE TO RELATED APPLICATION

This patent application is based on and claims priority pursuant to 35 U.S.C. § 119(a) to Japanese Patent Application No. 2022-186561, filed on Nov. 22, 2022, in the Japan Patent Office, the entire disclosure of which is hereby incorporated by reference herein.

BACKGROUND

Technical Field

Embodiments of the present disclosure relate to an image forming apparatus, an image forming method, and a printed material.

Related Art

Currently, various indoor and outdoor performances are delivered, including effects designed to produce a distinctive or desired impression, so that visitors can enjoy extraordinary experiences in, for example, concert halls, event halls, aquariums, museums, or amusement parks. Some performances involve the cooperation of visitors in enlivening the venue so that the visitors can feel a sense of togetherness or unity. For example, in concert halls, the visitors may participate in lighting up the venue with distributed penlights.

As a part of such performances, various printed materials that the visitors have in the venue, such as admission tickets carried by the visitors or leaflets, brochures, or posters distributed in the venue, may be used.

SUMMARY

According to an embodiment of the present disclosure, an image forming apparatus includes an image forming unit and a plurality of developing containers. The image forming unit includes a plurality of developing stations to form an image on a print medium with toners, based on input image data. The plurality of developing containers contains the toners. The plurality of developing containers is attachable to and detachable from the plurality of developing stations. The plurality of developing containers includes a first developing container and a second developing container. The first developing container contains a first toner. The second developing container contains a second toner having a higher luminescence intensity under invisible light than the first toner. The first toner and the second toner are toners that form an image having a higher luminescence intensity under the invisible light than under visible light. The image forming unit adheres the second toner to the print medium before adhering the first toner when the image forming unit superimposes the first toner and the second toner one atop another on the print medium.

According to an embodiment of the present disclosure, an image forming method includes adhering a first toner to a print medium and superimposing a second toner on the first toner adhered to the print medium. The first toner is contained in a first container of a plurality of containers attachable to and detachable from a plurality of developing stations of an image forming unit of an image forming apparatus. The image forming unit forms an image on the print medium with toners contained in the plurality of containers. The second toner is contained in a second container of the plurality of containers. The first toner has a higher luminescence intensity under invisible light than the second toner. The first toner and the second toner are toners that form an image having a higher luminescence intensity under the invisible light than under visible light.

According to an embodiment of the present disclosure, a printed material includes a print medium and an image formed with a first toner superimposed on a second toner having a higher luminescence intensity under invisible light than the first toner on the print medium. The first toner and the second toner are toners that form an image having a higher luminescence intensity under the invisible light than under visible light.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
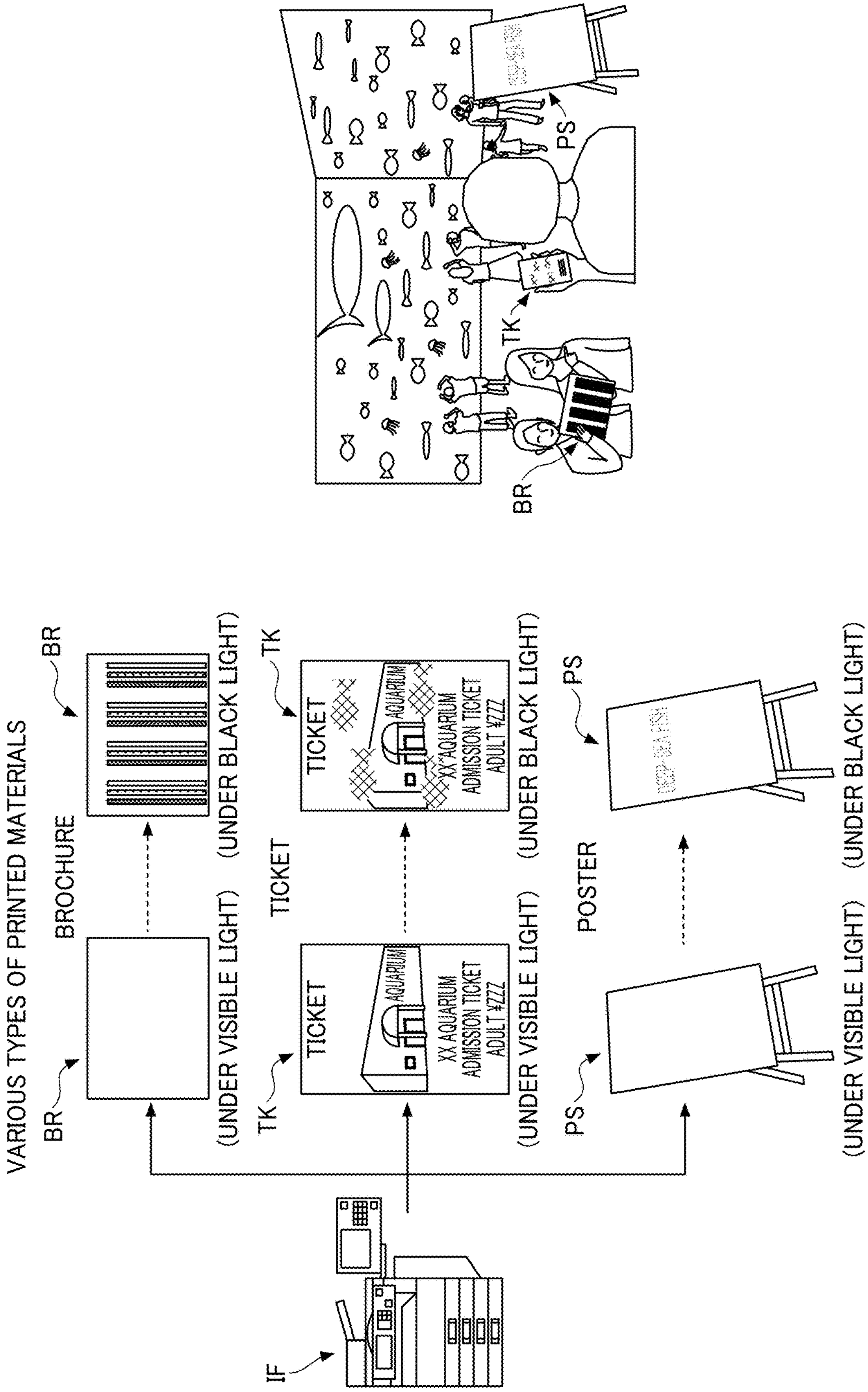
FIG. 1 is a diagram illustrating a scene of the use of printed materials produced by an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals or signs designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below.

As used herein, the singular forms "a," "an," and "the" are intended to include the plural forms as well, unless the context clearly indicates otherwise.

For the sake of simplicity, like reference numerals or signs are given to identical or corresponding constituent elements such as parts and materials having the same functions, and redundant descriptions thereof are omitted unless otherwise required.

As used herein, the term "connected/coupled" includes both direct connections and connections in which there are one or more intermediate connecting elements.

Initially, a description is given of a scene of the use of printed materials produced by an image forming apparatus IF according to an embodiment of the present disclosure.

FIG. 1 is a diagram illustrating a scene of the use of printed materials produced by the image forming apparatus IF according to the present embodiment.

Examples of the printed materials produced by the image forming apparatus IF include, but are not limited to, a brochure BR, a ticket TK, and a poster PS. Each of the brochure BR, the ticket TK, and the poster PS includes an invisible image, which is invisible or hardly visible under visible light (in a bright place) but visible under a black light (in a dark place). The brochure BR, the ticket TK, and the poster PS are used such that the invisible image printed on each of the brochure BR, the ticket TK, and the poster PS is visually recognized in a dark place (in the example illustrated in FIG. 1, in an exhibition room of an aquarium).

A description is given below of a tandem color laser copier including a plurality of photoconductors aligned in parallel, as an example of the image forming apparatus IF according to the present embodiment. The tandem color laser copier may be referred to simply as a copier in the following description.

Initially, a description is given of a basic configuration of the copier according to the present embodiment.

Figure 2:
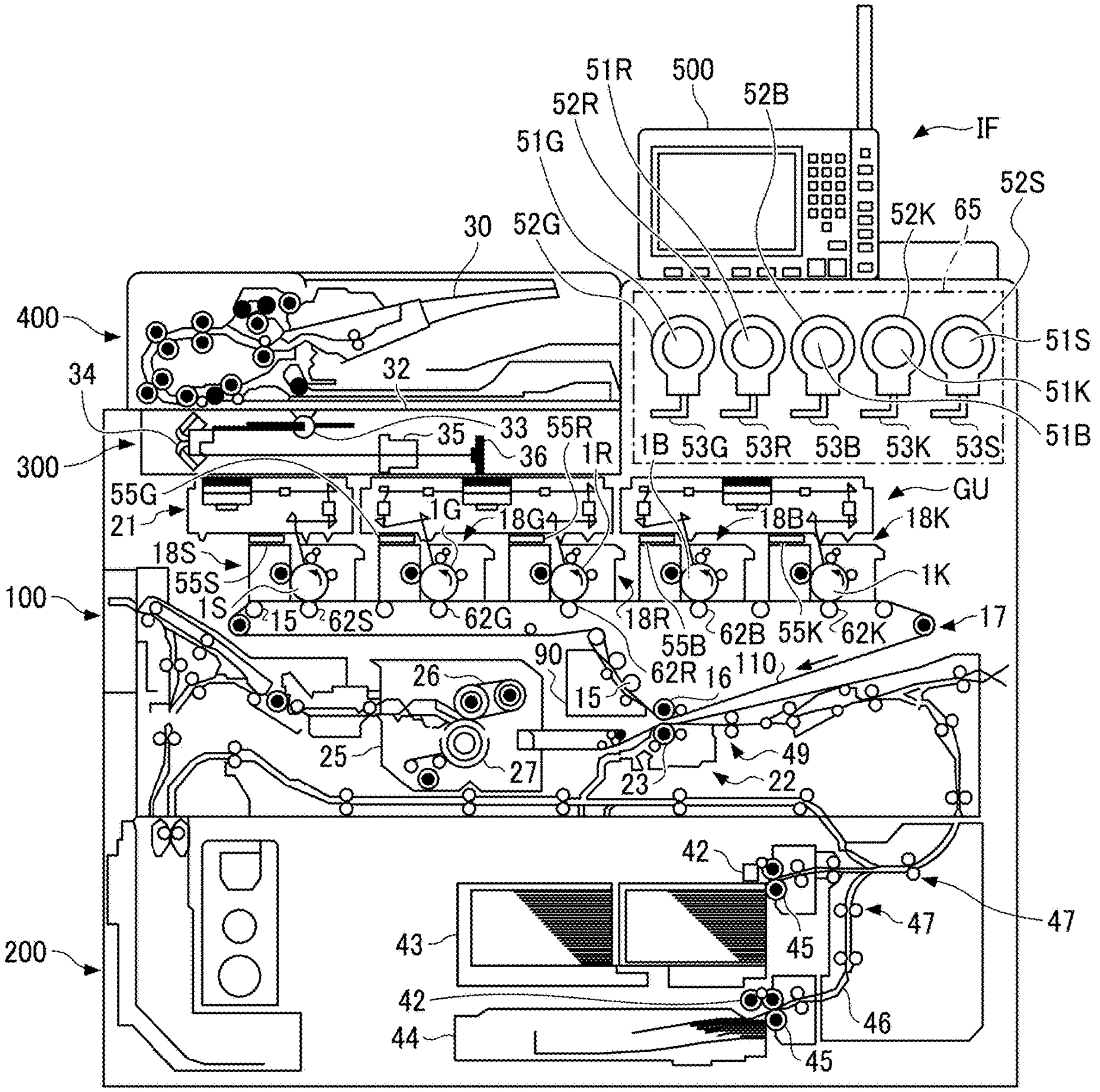
FIG. 2 is a schematic diagram illustrating a configuration of a copier according to an embodiment of the present disclosure.

FIG. 2 is a schematic diagram illustrating a configuration of the copier according to the present embodiment.

The copier is an electrophotographic image forming apparatus and includes, for example, a printer 100, a feeding device 200, a scanner 300, and an automatic document feeder (ADF) 400. Alternatively, the image forming apparatus IF according to an embodiment of the present disclosure may include part of these components and is not limited by name provided that the image forming apparatus IF is a printing device having a printing function of printing and outputting printed materials.

The printer 100 includes an image forming unit GU. The image forming unit GU includes five developing stations 18S, 18G, 18R, 18B, and 18K that form images in colors of special color (S), invisible green (G), invisible red (R), invisible blue (B), and black (K) as a key plate, respectively. Suffixes S, G, R, B, and K appended to the numeral "18" of reference signs 18S, 18G, 18R, 18B, and 18K indicate that the developing stations 18S, 18G, 18R, 18B, and 18K are components for the colors of special color, invisible green, invisible red, invisible blue, and black, respectively. The same applies to other reference signs used in the following description. In the following description, S, G. R, B, and K may denote the colors of special color, invisible green, invisible red, invisible blue, and black, respectively. To simplify the description and the drawings, the suffixes S, G, R, B, and K may be omitted unless otherwise required. The special color is a generic term for any color different from the colors of invisible green, invisible red, invisible blue, and black.

The invisible green refers to a green color that can be visually recognized under invisible light but is difficult to visually recognize under visible light. The invisible red refers to a red color that can be visually recognized under invisible light but is difficult to visually recognize under visible light. The invisible blue refers to a blue color that can be visually recognized under invisible light but is difficult to visually recognize under visible light. The printer 100 superimposes the colors of invisible green, invisible red, and invisible blue one atop another, to represent a desired invisible color, which can be visually recognized under invisible light but is difficult to visually recognize under visible light. The black refers to a black color visible under visible light. The special color refers to a special color visible under visible light.

Visible light is a form of electromagnetic radiation having a wavelength that is perceived as light by humans. Invisible light is a form of electromagnetic radiation having a wavelength other than that of visible light. In the present embodiment, the invisible light is long-wavelength ultraviolet light emitted by, for example, a black light. In the present embodiment, the invisible color is transparent under visible light such as light emitted by a fluorescent lamp and sunlight, whereas the invisible color is visible under invisible light such as ultraviolet light emitted by a black light.

Specifically, an invisible green image is formed with an invisible green toner. An invisible red image is formed with an invisible red toner. An invisible blue image is formed with an invisible blue toner. In the following description, the invisible green toner, the invisible red toner, and the invisible blue toner may be referred to as “G toner,” “R toner,” and “B toner,” respectively. An image of an invisible color other than the colors of the invisible green, the invisible red, and the invisible blue is formed with at least two of the invisible color toners (i.e., at least two of the G toner, the R toner, and the B toner) superimposed one atop another. The invisible black, which is a black color visible under invisible light, is formed by adhering none of the G toner, the R toner, and the B toner. A special color image visible under visible light is formed with a special color toner, which may be referred to as “S toner” in the following description. A black image visible under visible light is formed with a black toner, which may be referred to as “K toner” in the following description.

In the present embodiment, a transparent toner (clear toner) and a transparent phosphor are combined to generate the invisible color toner. In other words, the invisible color toner is typically generated with the clear toner as a base. The transparent phosphor is, for example, a transparent fluorescent pigment or a transparent fluorescent dye. In the present embodiment, the invisible color toner is a pulverized toner having a fixing temperature higher than that of a polymerized toner. Alternatively, the invisible color toner may be a polymerized toner.

In addition to the developing stations 18S, 18G, 18R, 18B, and 18K, for example, an optical writing device 21, an intermediate transfer device 17, a secondary transfer device 22, a registration roller pair 49, and a fixing device 25 employing a belt fixing system are disposed in a housing of the printer 100.

The optical writing device 21 includes a light source, a polygon mirror, an f-θ lens, and a reflection mirror. The optical writing device 21 irradiates the surfaces of photoconductors 1S, 1G, 1R, 1B, and 1K with laser light according to image data.

The developing stations 18S, 18G, 18R. 18B, and 18K include the drum-shaped photoconductors 1S, 1G, 1R, 1B, and 1K, respectively. Each of the developing stations 18S, 18G, 18R, 18B, and 18K further includes, for example, a charging roller (charging means), a developing device (developing means), a drum cleaning device, and an electrostatic-charge removing lamp (electrostatic-charge removing means).

The surface of the photoconductor 1S in the developing station 18S for S (special color) is uniformly charged by the charging roller serving as the charging means. The charged surface of the photoconductor 1S is irradiated with laser light modulated and deflected by the optical writing device 21. Then, the potential of the irradiated portion (exposed portion) of the surface of the photoconductor 1S is attenuated. Due to this attenuation, an electrostatic latent image for S is formed on the surface of the photoconductor 1S. The electrostatic latent image for S thus formed is developed by the developing device serving as the developing means to be an S toner image.

The S toner image formed on the photoconductor 1S for S is primarily transferred to an intermediate transfer belt 110. After the primary transfer, the residual toner is removed by the drum cleaning device from the surface of the photoconductor 1S.

In the developing station 18S for S, the photoconductor 1S cleaned by the drum cleaning device is discharged by the electrostatic-charge removing lamp serving as the electrostatic-charge removing means. The photoconductor 18S is then uniformly charged by the charging roller and returns to the initial state. The above-described series of processes is similarly performed in the developing stations 18G. 18R, 18B and 18K for the colors of G. R. B, and K.

The intermediate transfer device 17 includes, for example, the endless intermediate transfer belt 110 and a belt cleaning device 90. The intermediate transfer device 17 further includes, for example, driving rollers 15, a secondary transfer backup roller 16, and five primary transfer bias rollers 62S, 62G, 62R, 62B, and 62K.

The endless intermediate transfer belt 110 is stretched taut around a plurality of tension rollers such as the driving rollers 15 disposed inside the loop of the intermediate transfer belt 110. The endless intermediate transfer belt 110 is endlessly moved in a clockwise direction in FIG. 2 by the rotation of the driving rollers 15 driven by a belt driving motor.

The primary transfer bias rollers 62S, 62G, 62R, 62B, and 62K for S, G, R, B, and K are disposed in contact with the back surface (inner circumferential surface) of the intermediate transfer belt 110. A primary transfer bias output from a power source is applied to each of the primary transfer bias rollers 62S, 62G, 62R, 62B, and 62K. The primary transfer bias rollers 62S, 62G, 62R, 62B, and 62K press the intermediate transfer belt 110 toward the photoconductors 1S, 1G, 1R, 1B, and 1K, respectively, from the back surface of the intermediate transfer belt 110. As a result, primary transfer nips for S. G, R. B. and K are formed between the front surface (outer circumferential face) of the intermediate transfer belt 110 and the photoconductors 1S, 1G, 1R, 1B, and 1K in contact with the outer circumferential face of the intermediate transfer belt 110. Due to the influence of the primary transfer bias, primary transfer electric fields are formed at the primary transfer nips between the photoconductors 1S, 1G, 1R, 1B, and 1K and the primary transfer bias rollers 62S, 62G, 62R, 62B, and 62K.

The S toner image formed on the photoconductor 1S for S is primarily transferred onto the intermediate transfer belt 110 by the influence of the primary transfer electric field and the nip pressure. A G toner image, an R toner image, a B toner image, and a K toner image respectively formed on the photoconductors 1G, 1R, 1B, and 1K for G, R, B, and K are sequentially superimposed and primarily transferred onto the S toner image. The primary transfer by the superimposition results in the formation of a multicolor toner image on the intermediate transfer belt 110.

The multicolor toner image formed on the intermediate transfer belt 110 is secondarily transferred to a recording sheet at a secondary transfer nip described later. The residual toner remaining on the surface of the intermediate transfer belt 110 that has passed through the secondary transfer nip is cleaned by the belt cleaning device 90 that sandwiches the intermediate transfer belt 110 with the driving roller 15.

The secondary transfer device 22 disposed below the intermediate transfer device 17 brings a secondary transfer roller 23 into contact with a portion of the intermediate transfer belt 110 wound around the secondary transfer backup roller 16, to form the secondary transfer nip. A secondary transfer bias having the same polarity as the toner is applied to the secondary transfer backup roller 16, whereas the secondary transfer roller 23 is grounded. Accordingly, a secondary transfer electric field is formed at the secondary transfer nip to electrostatically move the multicolor toner image from the intermediate transfer belt 110 toward the secondary transfer roller 23. The action of the secondary transfer electric field and the nip pressure secondarily transfers the multicolor toner image onto the recording sheet, which is fed into the secondary transfer nip by the registration roller pair 49 in synchronization with the multicolor toner image on the intermediate transfer belt 110.

The feeding device 200 disposed at a lower portion in the housing of the printer 100 includes a paper bank 43 and a feeding cassette 44 that accommodate a stack of recording sheets as a sheet bundle inside. A feeding roller 42 is pressed against an uppermost recording sheet of the sheet bundle accommodated in each of the paper bank 43 and the feeding cassette 44. The feeding roller 42 is rotated to feed the uppermost recording sheet toward a feeding passage 46.

A plurality of conveyance roller pairs 47 is disposed along the feeding passage 46 that receives the recording sheet fed from the paper bank 43 or the feeding cassette 44. The registration roller pair 49 is disposed around an end of the feeding passage 46. The recording sheet is conveyed through the feeding passage 46 toward the registration roller pair 49. The recording sheet conveyed toward the registration roller pair 49 is sandwiched between the rollers of the registration roller pair 49. On the other hand, in the intermediate transfer device 17, the multicolor toner image formed on the intermediate transfer belt 110 enters the secondary transfer nip along with the endless movement of the intermediate transfer belt 110.

The activation of the registration roller pair 49 is timed to feed the recording sheet sandwiched between the rollers of the registration roller pair 49 to the secondary transfer nip to bring the recording sheet into close contact with the multicolor toner image at the secondary transfer nip. As a result, the multicolor toner image on the intermediate transfer belt 110 is brought into close contact with the recording sheet at the secondary transfer nip. Then, the toner image is secondarily transferred onto the recording sheet to be a full-color image on the white recording sheet. After the recording sheet thus bearing the full-color image exits the secondary transfer nip as the secondary transfer roller 23 is driven to rotate, the recording sheet is sent to the fixing device 25 via a sheet conveyance unit including a conveyance belt.

The fixing device 25 includes a belt unit that endlessly moves a fixing belt 26 stretched taut around two rollers and a pressure roller 27 that is pressed against one of the rollers of the belt unit. The fixing belt 26 and the pressure roller 27 receive the recording sheet from the sheet conveyance unit and sandwich the recording sheet at a fixing nip formed between the fixing belt 26 and the pressure roller 27 in contact with each other. A fixing roller, which is one of the two rollers of the belt unit and is pressed by the pressure roller 27, includes a heat source (heater) inside to heat the fixing belt 26 by heat generation of the heat source. The heated fixing belt 26 heats the recording sheet sandwiched at the fixing nip. The full-color image is fixed on the recording sheet by the influence of the heating and the nip pressure.

The recording sheet subjected to the fixing process in the fixing device 25 rests on a stacker projecting from a left side plate of a housing of the copier or returned to the secondary transfer nip so that another toner image is formed on the other side of the recording sheet.

When a document is copied, for example, a bundle of document sheets is placed on a document tray 30 of the ADF 400. When the bundle of sheet documents is a one-side-bound document closed like a book, the document is placed on a platen 32. Before the one side-bound document is placed on the platen 32, the ADF 400 is opened with respect to the housing of the copier to expose the platen 32 of the scanner 300. After the one-side-bound document is placed on the platen 32, the one-side-bound document is pressed by the closed ADF 400.

When a start key is pressed with the document placed, the scanner 300 starts a document reading operation. On the other hand, when the bundle of document sheets is placed on the ADF 400, the ADF 400 automatically feeds the document sheets to the platen 32 prior to the document reading operation.

The document reading operation starts with the traveling of a first carrier 33 together with a second carrier 34. A light source carried on the first carrier 33 emits light. The light reflected from the surface of the document is further reflected by a mirror disposed in the second carrier 34 to an image forming lens 35. After passing through the image forming lens 35, the light enters a reading sensor 36 as incident light. The reading sensor 36 generates image information according to the incident light.

In parallel with the above-described document reading operation, the components of the developing stations 18S, 18G, 18R, 18B, and 18K, the intermediate transfer device 17, the secondary transfer device 22, and the fixing device 25 start the respective operations. According to the image information generated by the reading sensor 36, the optical writing device 21 is driven and controlled to form the S, G, R, B, and K toner images on the photoconductors 1S, 1G, 1R, 1B, and 1K, respectively. These toner images are superimposed and transferred onto the intermediate transfer belt 110 to form a multicolor toner image.

Almost simultaneously with the start of the document reading operation, the feeding device 200 starts a feeding operation. In the feeding operation, the feeding device 200 selectively rotates one of the feeding rollers 42 to feed recording sheets from the paper bank 43 or the feeding cassette 44. A separation roller 45 separates one of the recording sheets from another and feeds the separated recording sheet to the feeding passage 46. The recording sheet entering the feeding passage 46 is conveyed toward the secondary transfer nip by conveyance roller pairs.

A controller including a central processing unit (CPU) is disposed in the housing of the printer 100 to control the devices. A control panel 500 including a liquid crystal display (LCD) and various keys is disposed on the upper surface of the housing. An operator sends a command to the controller through an input operation on the control panel 500 to designate a simplex print mode in which an image is formed only on one side of a recording sheet or a duplex print mode in which images are formed on both sides of the recording sheet.

Figure 3:
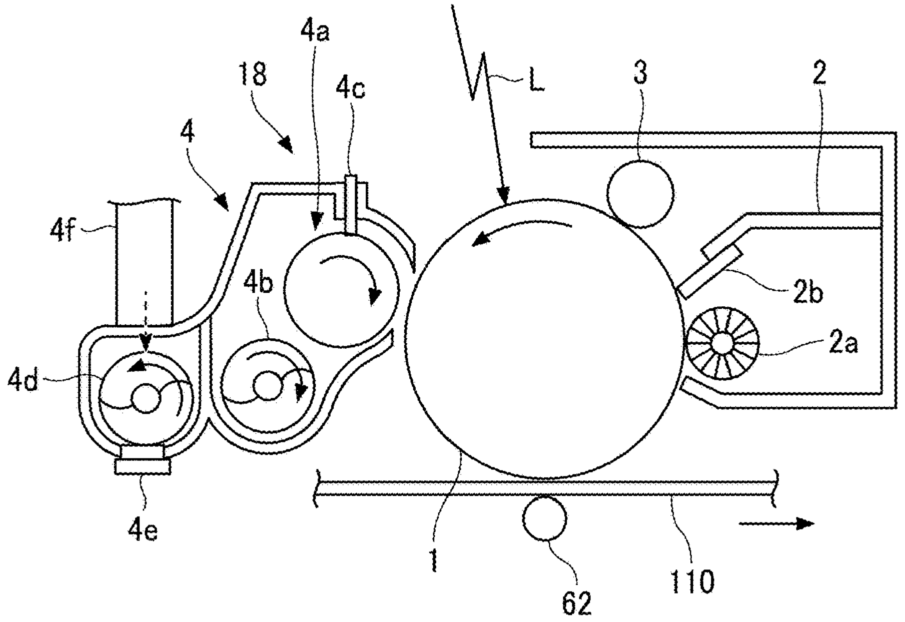
FIG. 3 is a schematic diagram illustrating a configuration of a developing station in a copier according to an embodiment of the present disclosure.

FIG. 3 is a schematic diagram illustrating a configuration of one of the five developing stations 18S, 18G, 18R, 18B, and 18K according to the present embodiment.

The five developing stations 18S, 18G, 18R, 18B, and 18K have substantially the same configuration. The surface of the photoconductor 1 is uniformly charged to a negative polarity by a charging roller 3 while the photoconductor 1 rotates in a counterclockwise direction indicated by an arrow in FIG. 3. An electrostatic latent image is formed on the uniformly charged surface of the photoconductor 1 by laser light L emitted from the optical writing device 21. The electrostatic latent image is developed by a developing device 4 into a toner image.

The developing device 4 includes a developing roller 4*a*. The developing roller 4*a* includes a cylindrical developing sleeve and a magnet roller that is disposed inside so as not to rotate together with the developing sleeve. While rotating in a clockwise direction indicated by an arrow in FIG. 3, the developing sleeve carries a developer containing a toner and a magnetic carrier on the surface of the developing sleeve by a magnetic force generated by the magnet roller. The toner of the developer adheres to the electrostatic latent image on the surface of the photoconductor 1. Thus, the developing device 4 develops the electrostatic latent image. A supply screw 4*b* is disposed beside the developing roller 4*a* in parallel with the developing roller 4*a*. While supplying the developer to the developing roller 4*a*, the supply screw 4*b* conveys the developer from the back to the front in a direction orthogonal to the surface of the paper on which FIG. 3 is drawn.

A developing doctor 4*c* faces, with a given gap, a portion of a circumferential surface of the developing sleeve of the developing roller 4*a* downstream from a portion of the circumferential surface of the developing sleeve facing the supply screw 4*b* in a direction of rotation of the developing roller 4*a*. The developing doctor 4*c* regulates the layer thickness of the developer on the developing sleeve to be suitable for development. A circulation screw 4*d* is disposed to the left of the supply screw 4*b* in FIG. 3. The circulation screw 4*d* conveys the developer from the front to the back in the direction orthogonal to the surface of the paper on which FIG. 3 is drawn.

In a casing of the developing device 4, a partition wall is disposed between a space in which the supply screw 4*b* is disposed and a space in which the circulation screw 4*d* is disposed, to partition the spaces. However, the two spaces are not completely partitioned from each other. A communication port through which the two spaces communicate is disposed at each of the back end portion and the front end portion of the partition wall in the direction orthogonal to the surface of the paper on which FIG. 3 is drawn. In the following description, the space in which the supply screw 4*b* is disposed may be referred to as a supply compartment, whereas the space in which the circulation screw 4*d* is disposed may be referred to as a circulation compartment.

On the developing sleeve, the layer of the developer thinned by the developing doctor 4*c* made of stainless steel is conveyed to a developing area in which the layer of the developer faces the photoconductor 1, as the developing sleeve rotates, to develop the electrostatic latent image. The surface of the developing sleeve made of an aluminum base tube or a stainless base tube is subjected to V-groove processing or sandblast processing.

As the developing sleeve rotates, the developer that has contributed to development is conveyed to a position where the developer faces the supply screw 4*b*. The developer is separated from the surface of the developing sleeve by the action of a repulsive magnetic field formed at the position by the magnetic pole of the magnet roller, to return into the supply compartment. As the supply screw 4*b* rotates, the developer is conveyed to the front end portion of the supply compartment in the direction orthogonal to the surface of the paper on which FIG. 3 is drawn. At the front end portion of the supply compartment, the developer passes through the communication port of the partition wall into the circulation compartment.

In the circulation compartment, the developer is conveyed from the front to the back in the direction orthogonal to the surface of the paper on which FIG. 3 is drawn, in accordance with the rotation of the circulation screw 4*d*. In the course of this conveyance, the toner concentration is detected by a toner concentration sensor 4*e* as a magnetic-permeability sensor. Based on the detection result, an appropriate amount of toner is supplied through a supply path 4*f*. As a result, the toner concentration of the developer having a toner concentration lowered by the previous development is restored to a given target concentration.

The developer having a toner concentration thus restored is conveyed to the back end portion of the circulation compartment in the direction orthogonal to the surface of the paper on which FIG. 3 is drawn, in accordance with the rotation of the circulation screw 4*d*, to return to the supply compartment through the communication port of the partition wall.

The residual toner that has not been primarily transferred to the intermediate transfer belt 110 remains adhering to the surface of the photoconductor 1 that has passed through the primary transfer nip. The residual toner is removed from the surface of the photoconductor 1 by a cleaning brush 2*a* and a cleaning blade 2*b* of the drum cleaning device 2.

In FIG. 2, a bottle container 65 is disposed at an upper portion in the housing of the printer 100. The bottle container 65 accommodates toner bottles 51S, 51G, 51R, 511B, and 51K that accommodate S toner, G toner, R toner, B toner, and K toner, respectively, for replenishment. Bottle drivers 52S. 52G. 52R, 52B, and 52K of toner supply devices for S. G. R, B, and K, respectively, are fixed to the bottle container 65. A description of the toner supply devices is deferred. The bottle drivers 52S, 52G, 52R, 52B, and 52K for S, G. R, B, and K detachably hold the toner bottles 51S, 51G, 51R, 51B, and 51K, respectively.

Figure 4:
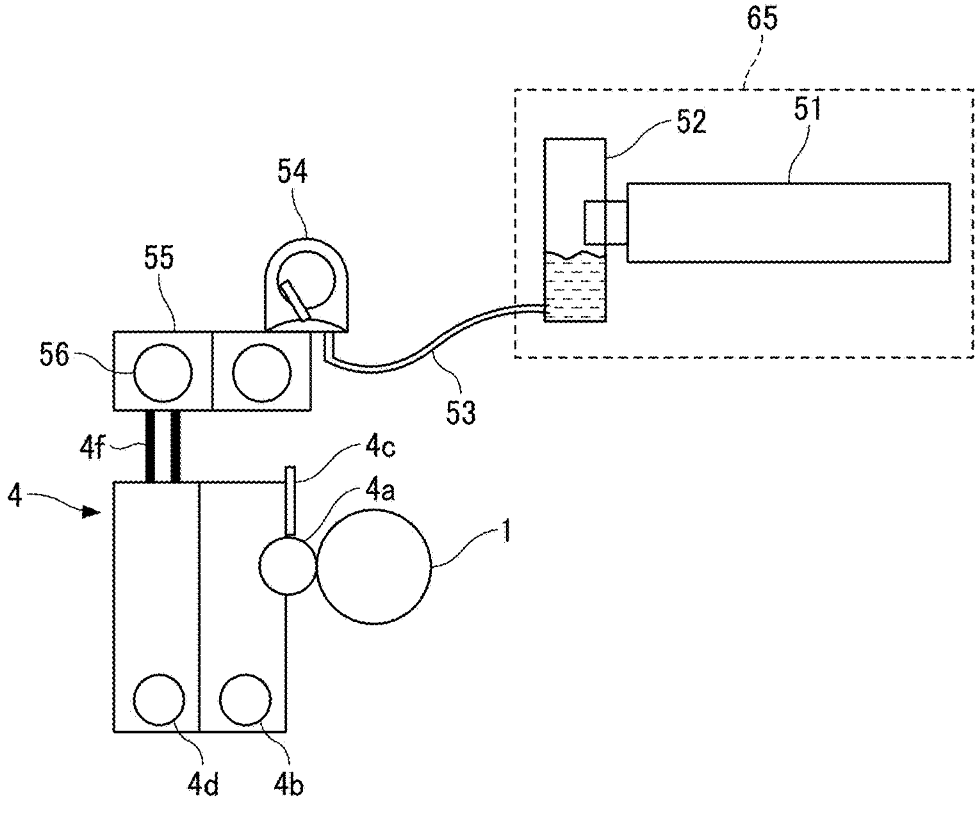
FIG. 4 is a schematic view of a toner bottle, a toner supply device, a developing device, and a photoconductor in a copier according to an embodiment of the present disclosure.

FIG. 4 is a schematic view of the toner bottle 51, the toner supply device, the developing device 4, and the photoconductor 1 according to the present embodiment.

The toner bottles 51 for the five toners have substantially the same configuration. Similarly, the toner supply devices for the five toners have substantially the same configuration. The developing devices 4 for the five toners have substantially the same configuration. The photoconductors 1 for the five toners have substantially the same configuration.

The toner supply device includes the bottle driver 52 disposed in the bottle container 65. The toner supply device further includes a pre-supply reservoir 55, a toner supplier 56, and a suction pump 54, which are disposed right above the developing device 4. The toner supply device further includes a transfer tube 53 made of a flexible tube as a conveyance path through which the toner is transferred from a pre-transfer reservoir of the bottle driver 52 disposed in the bottle container 65 to the pre-supply reservoir 55 disposed right above the developing device 4.

A spiral rail projection is disposed on an inner circumferential surface of the toner bottle 51. The bottle driver 52 holding the head of the toner bottle 51 drives and rotates the bottle-shaped toner bottle 51 in a circumferential direction of the toner bottle 51. The toner contained in the toner bottle 51 is then moved from the bottom to the head of the toner bottle 51 by the action of the rail projection. The toner discharged from an opening in the head of the toner bottle 51 by the movement is reserved in the pre-transfer reservoir of the bottle driver 52.

The flexible transfer tube 53 has one end coupled to the suction pump 54 and another end coupled to the pre-transfer reservoir of the bottle driver 52. The suction pump 54, as a uniaxial eccentric screw pump, is driven to suck the toner in the pre-transfer reservoir of the bottle driver 52 through the transfer tube 53. By this suction, the toner is discharged from a discharge port of the suction pump 54 and falls into the pre-supply reservoir 55 while the toner in the pre-transfer reservoir of the bottle driver 52 is sucked into the transfer tube 53 and transferred toward the pre-supply reservoir 55.

The amount of toner sucked by the suction pump 54 per unit time slightly varies depending on, for example, the bulk density of the toner, the temperature, and the humidity. For this reason, if the toner is directly supplied to the developing device 4 by the suction pump 54, the variations in the amount of toner supplied per unit time may hamper an attempt to stably keep the toner concentration of the developer at a target concentration.

To address such a situation, in the copier of the present embodiment, the toner transferred from the bottle driver 52 to the vicinity of the developing device 4 by the suction pump 54 is temporarily reserved in the pre-supply reservoir 55. The toner supplier 56 is disposed in the pre-supply reservoir 55 to supply toner with little variations in the amount of toner supplied per unit driving time. The rotation of the toner supplier 56 feeds the toner from the pre-supply reservoir 55 into the supply path 4*f* of the developing device 4.

Figure 5A:
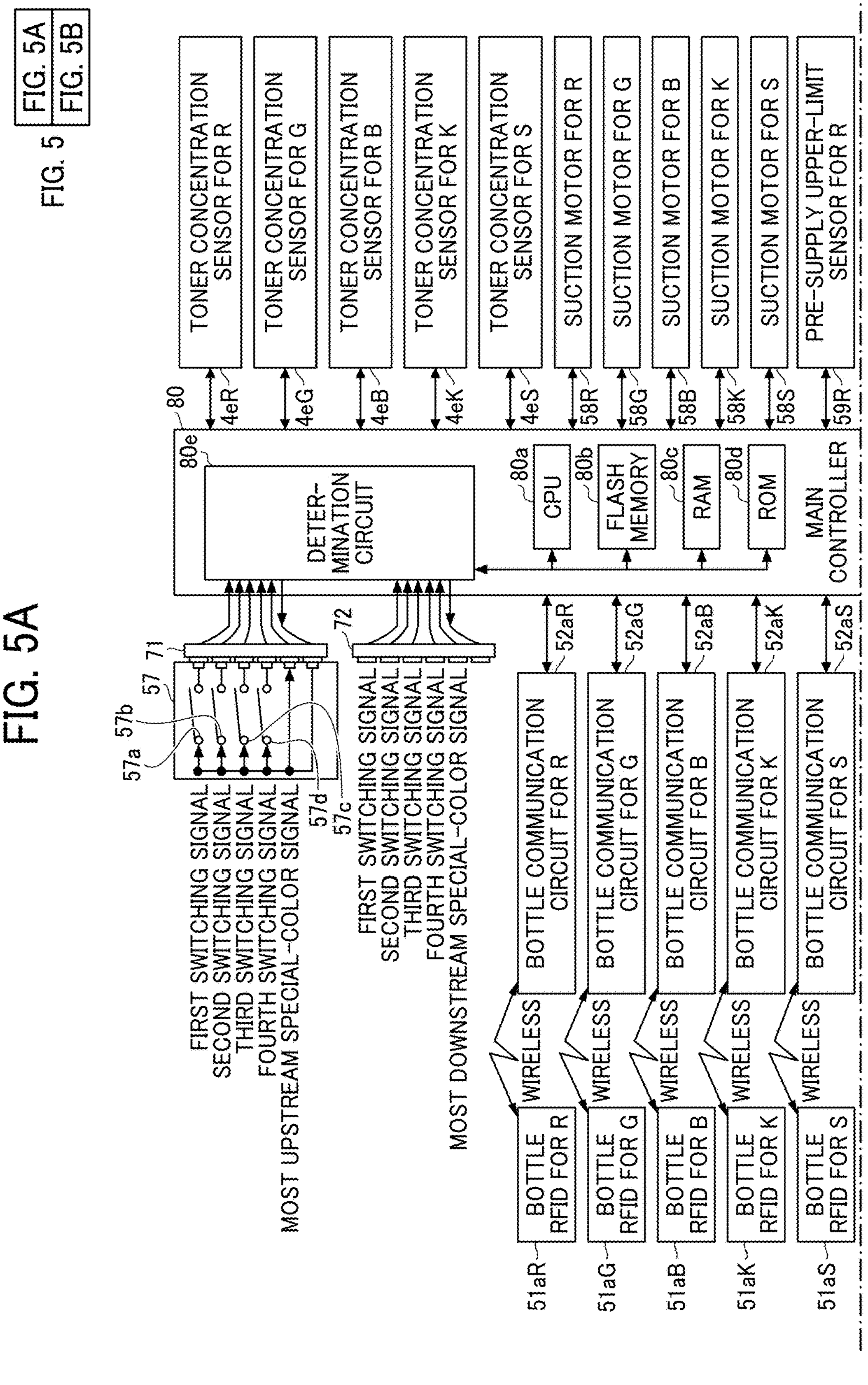
FIGS. 5A and 5B (FIG. 5) are block diagrams illustrating an electric circuit of a copier according to an embodiment of the present disclosure.
Figure 5B:
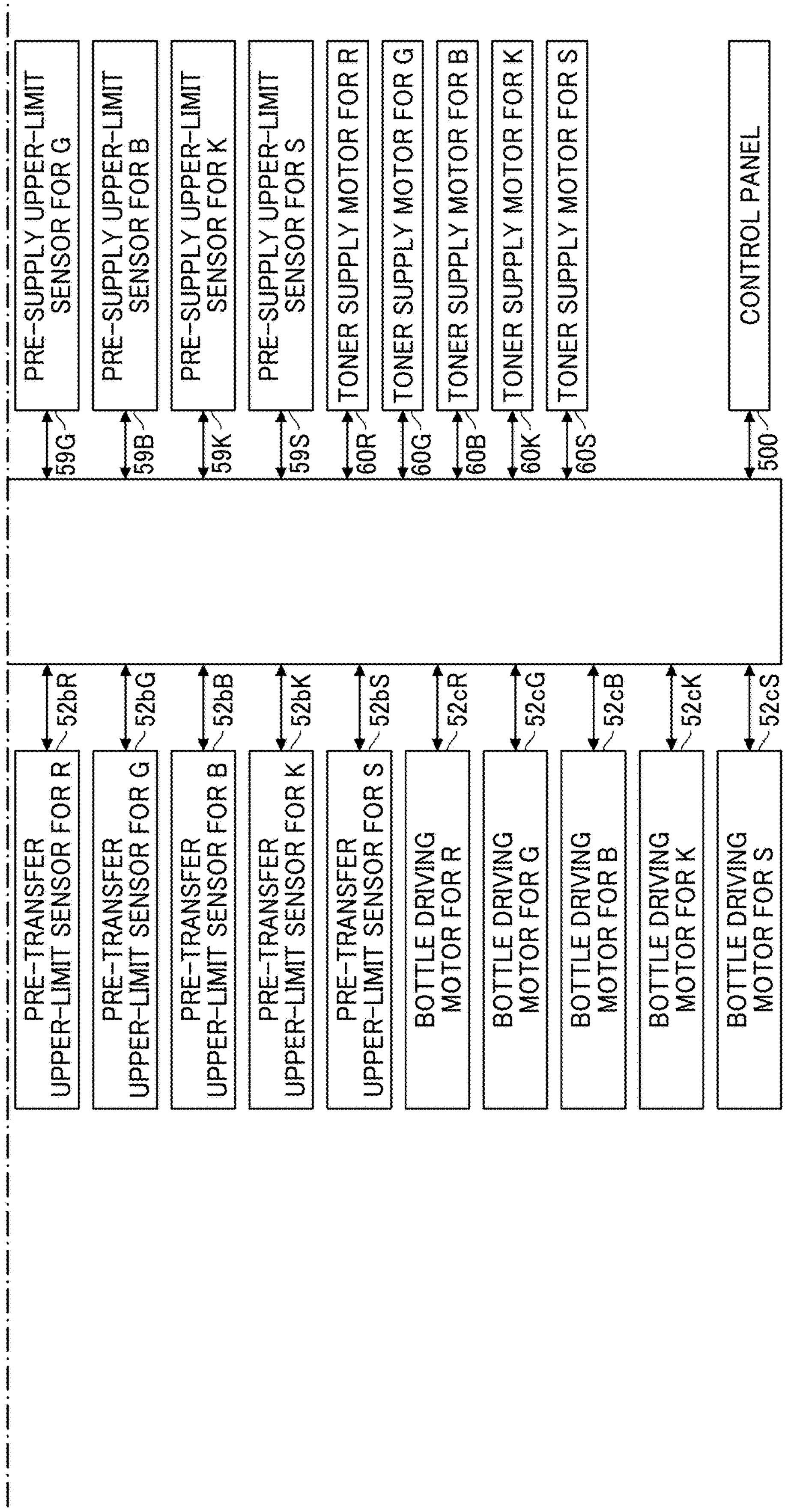

FIGS. 5A and 5B (FIG. 5) are block diagrams illustrating an electric circuit of the copier according to the present embodiment.

In FIGS. 5A and 5B (FIG. 5), a main controller 80 controls the driving of the components of the copier and performs various types of calculations. For example, the main controller 80 includes a CPU 80*a*, a flash memory 80*b*, a random access memory (RAM) 80*c*, a read-only memory (ROM) 80*d*, and a determination circuit 80*e*. Although various devices and sensors are electrically connected to the main controller 80, the devices and sensors deeply related to the present embodiment are illustrated in FIGS. 5A and 5B (FIG. 5).

The suction motors 58R, 58G, 58B, 58K, and 58S for R, G, B, K, and S, which are connected to the main controller 80, drive respective suction pumps 54 (R, G, B, K, and S). When the suction motors 58R, 58G, 58B, 58K, and 58S drive the respective suction pumps 54 (R, G, B, K. and S), the R toner, the G toner, the B toner, the K toner, and the S toner are transferred from the bottle drivers 52R, 52G, 52B, 52K, and 52S to the pre-supply reservoirs 55R, 55G, 55B, 55K, and 55S, respectively.

Toner supply motors 60R, 60G, 60B, 60K, and 60S for R, G, B, K. and S, which are connected to the main controller 80, are drive sources of the respective toner suppliers 56 (R. G, B, K, and S) of the pre-supply reservoirs 55R, 55G, 55B, 55K, and 55S.

When the toner suppliers 56 (R, G, B, K, and S) are driven and rotated by the toner supply motors 60R, 60G, 60B, 60K, and 60S, the R toner, the G toner, the B toner, the K toner, and the S toner are supplied to the developing devices 4R. 4G, 4B. 4K, and 4S, respectively.

The pre-supply reservoirs 55R, 55G, 55B, 55K, and 55S are respectively provided with pre-supply upper-limit sensors 59R, 590, 59B, 59K, and 59S for R. G, B, K, and S, which are connected to the main controller 80. The pre-supply upper-limit sensors 59R, 59G, 59B, 59K, and 59S respectively detect whether the levels of the R toner, the G toner, the B toner, the K toner, and the S toner reserved in the pre-supply reservoirs 55R, 55G, 55B, 55K, and 55S reach the upper limit levels, and transmit the detection results to the main controller 80. When the signals sent from the pre-supply upper-limit sensors 59R, 59G, 59B, 59K, and 59S for R, G, B, K, and S change from upper-limit-level detection signals to non-detection signals, the main controller 80 starts a time measuring process of measuring toner supply times for R. G, B. K, and S during which the R, G, B, K, and S toners are supplied. The time measuring process is a process of measuring the driving times of the toner supply motors 60R, 60G, 60B, 60K, and 60S as the toner supply times for R. G, B. K. and S. When the toner supply time reaches a given threshold for each of R. G, B, K, and S, the main controller 80 resets the toner supply time to zero and executes a toner transfer process. The toner transfer process is a process of transferring toner from the pre-transfer reservoir of the bottle driver 52 to the pre-supply reservoir 55 by driving the suction motor 58 for a color for which the toner supply time has reached the given threshold. More specifically, the toner transfer process is a process of driving the suction motors 58R, 58G, 58B, 58K, and 58S until the signals transmitted from the pre-supply upper-limit sensors 59R, 59G. 59B, 59K, and 59S change from the non-detection signals to the upper-limit-level detection signals.

The bottle drivers 52R, 52G, 52B, 52K, and 52S are respectively provided with bottle driving motors 52*c*R, 52*c*G, 52*c*B, 52*c*K, and 52*c*S for R. G. B. K. and S, which are connected to the main controller 80. The bottle driving motors 52*c*R. 52*c*G, 52*c*B, 52*c*K, and 52*c*S drive the bottle drivers 52R, 52G, 52B, 52K, and 52S to rotate the toner bottles 51R, 51G. 51B, 51K, and 51S attached to the bottle drivers 52R, 52G, 52B, 52K, and 52S, respectively. The rotation of the toner bottles 51R, 510, 51B, 51K, and 51S discharges the R toner, the G toner, the B toner, the K toner, and the S toner from the toner bottles 51R, 51G, 51B. 51K, and 51S to the pre-transfer reservoirs of the bottle drivers 52R, 52G, 52B, 52K, and 52S, respectively.

The bottle drivers 52R, 52G, 52B, 52K, and 52S for R, G, B, K. and S are respectively provided with pre-transfer upper-limit sensors 52*b*R, 52*b*G, 52*b*B, 52*b*K, and 52*b*S for R, G, B, K, and S, which are connected to the main controller 80. The pre-transfer upper-limit sensors 52*b*R, 52*b*G, 52*b*B, 52*b*K, and 52*b*S respectively detect whether the height positions of the R toner, the G toner, the B toner, the K toner, and the S toner stored in the pre-transfer reservoirs of the bottle drivers 52R, 52G. 52B, 52K, and 52S are at the upper limit positions, and transmit the detection results to the main controller 80.

When the signals from the pre-transfer upper-limit sensors 52*b*R, 52*b*G, 52*b*B, 52*b*K, and 52*b*S for R, G, B, K, and S change from the upper-limit-level detection signals to the non-detection signals, the main controller 80 performs a toner discharging process. The toner discharging process is a process of driving the bottle driving motors 52*c*R, 52*c*G, 52*c*B, 52*c*K, and 52*c*S until the signals from the pre-transfer upper-limit sensors 52*b*R, 52*b*G, 52*b*B, 52*b*K, and 52*b*S change from the non-detection signals to the upper-limit-level detection signals. This process discharges the toners from the toner bottles 51R, 51G, 51B. 51K, and 51S to the pre-transfer reservoirs of the bottle drivers 52R, 52G, 52B, 52K, and 52S and raises the toner level in the pre-transfer reservoirs to the upper limit level. In this process, in a case where the signals do not change to the upper-limit-level detection signals when the driving time of the bottle driving motors 52*c*R, 52*c*G, 52*c*B, 52*c*K, and 52*c*S reaches the given upper limit time, the main controller 80 displays, on the control panel 500, an alarm indicating that the bottle is empty.

The bottle drivers 52R, 52G, 52B, 52K, and 52S for R, G. B, K. and S are respectively provided with bottle communication circuits 52*a*R, 52*a*G, 52*a*B, 52*a*K, and 52*a*S for R, G, B, K, and S, which are connected to the main controller 80. On the other hand, the toner bottles 51R, 51G, 51B, 51K, and 51S for R. G. B. K, and S are respectively provided with bottle radiofrequency identifications (RFIDs) 51*a*R, 51*a*G, 51*a*B, 51*a*K, and 51*a*S. For example, identification (ID) numbers and toner color information are stored in the bottle RFIDs 51*a*R, 51*a*G, 51*a*B, 51*a*K, and 51*a*S.

When the toner bottles 51R, 51G, 51B, 51K, and 51S for R, G, B, K, and S are respectively attached to the bottle drivers 52R, 52G, 52B, 52K, and 52S, wireless communication can be performed between the bottle RFIDs 51*a*R, 51*a*G, 51*a*B, 51*a*K, and 51*a*S for R, G, B, K, and S and the bottle communication circuits 52*a*R, 52*a*G, 52*a*B, 52*a*K, and 52*a*S. The bottle communication circuits 52*a*R, 52*a*G, 52*a*B, 52*a*K, and 52*a*S for R, G, B, K, and S acquire the ID numbers and the toner color information of the toner bottles 51R, 51G, 51B, 51K, and 51S through the wireless communication and send the ID numbers and the toner color information thus acquired to the main controller 80.

FIG. 2 is a front view of the copier.

In the bottle container 65, the combinations of the toner bottle 51 and the bottle driver 52 are arranged in the order of G, R, B, K, and S when viewed from the front side of the copier. In the present embodiment illustrated in FIG. 2, the arrangement order of the combinations is fixed and remains unchanged. However, in another embodiment of the present disclosure, the arrangement order of the combinations may be changeable. In the following description, the positions in the arrangement order may be referred to as the first, second, third, fourth, and fifth bottle positions in order from the left in FIG. 2.

When the color information transmitted from the bottle communication circuit 52*a*G for G at the first bottle position is color information of a color different from G, the main controller 80 displays an error message on the control panel 500. The main controller 80 stands by without starting the control for the print job until the main controller 80 receives the color information of G from the bottle communication circuit 52*a*G for G. Similarly, an error message is displayed when the color information transmitted from each of the bottle communication circuit 52*a*R for R at the second bottle position, the bottle communication circuit 52*a*B for B at the third bottle position, the bottle communication circuit 52*a*K for K at the fourth bottle position, and the bottle communication circuit 52*a*S for S at the fifth bottle position is color information of a color different from the corresponding color (R, B, K, or S). The main controller 80 stands by without starting the control for the print job until the main controller 80 receives the color information of R, B, K, and S from the bottle communication circuit 52*a*R, 52*a*B, 52*a*K, and 52*a*S for R, B, K, and S. Such a configuration prevents the occurrence of various unfavorable circumstances that may be caused by performing a print job with a toner bottle of a color different from the original color placed at the first, second, third, fourth, or fifth bottle position.

In FIGS. 5A and 5B (FIG. 5), toner concentration sensors 4*e*R, 4*e*G, 4*e*B, 4*e*K, and 4*e*S for R, G. B, K. and S, which are connected to the main controller 80, include data memories to store their own color information. The main controller 80 can read the color information stored in the data memories of the toner concentration sensors 4*e*R, 4*e*G, 4*e*B, 4*e*K, and 4*e*S for R. G, B. K. and S and write given information into the data memories.

In FIG. 2, the toner images are primarily transferred onto the intermediate transfer belt 110 in the order of S, G, R, B, and K. In the following description, the positions where the developing stations 18S, 18G, 18R. 18B, and 18K for S, G. R, B, and K are placed in FIG. 2 may be referred to as the most upstream, second, third, fourth, and most downstream unit positions, respectively, in the direction of rotation of the intermediate transfer belt 110. The positions where the pre-supply reservoirs 55S, 55G, 55R, 55B, and 55K are placed right above the respective unit positions may be referred to as the most upstream, second, third, fourth, and most downstream reservoir positions, respectively, in the direction of rotation of the intermediate transfer belt 110.

When the color information stored in each of the data memories of the toner concentration sensors 4*e*G, 4*e*R, and 4*e*B of the developing stations 18G, 18R, and 18B placed at the second, third, and fourth unit positions is color information of a color different from the corresponding color (G, R, or B), the main controller 80 displays an error message on the control panel 500. The main controller 80 stands by without starting the control for the print job until the developing stations 18G, 18R, and 18B equipped with the toner concentration sensors 4*e*G, 4*e*R, and 4*e*B storing the color information of G, R, and B are placed at the second, third, and fourth unit positions, respectively. Such a configuration prevents the occurrence of various unfavorable circumstances that may be caused by performing a print job with a developing station of a color different from the original color placed at the first, second, third, or fourth unit position. A detailed description is deferred of confirmation of whether the color at the most upstream unit position or the most downstream unit position is correct.

A description is given below of features of the configuration of the copier according to the present embodiment.

In FIG. 2, the developing stations 18S, 18G, 18R, 18B, and 18K are aligned to superimpose and primarily transfer the toner images to the intermediate transfer belt 110 in the order of S. G, R, B, and K. However, depending on the type of the special color S, the color order of superimposition may be changed.

Figure 6B:
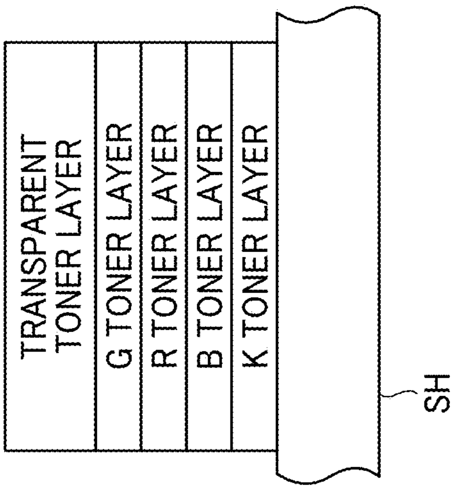
FIG. 6B is a schematic diagram illustrating toner layers of the toner image of FIG. 6A.
Figure 6A:
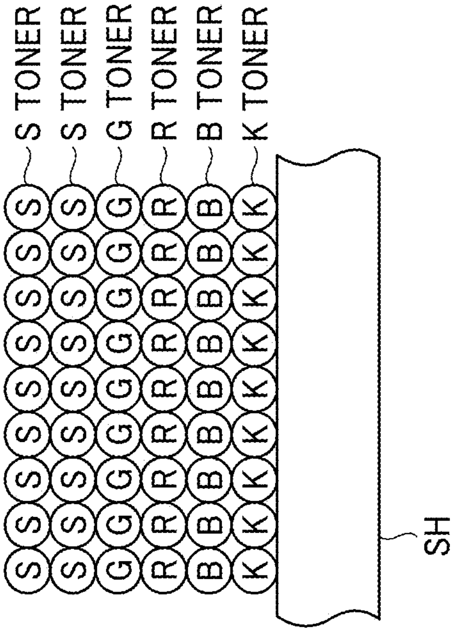
FIG. 6A is a schematic diagram illustrating a toner image including transparent toner formed by a copier according to an embodiment of the present disclosure.

For example, when the special color S is transparent, a transparent toner layer is typically formed to impart gloss to the image. In this case, the order of colors to be superimposed may be S, G, R, B, and K, which may be referred to as a default color order in the following description, as illustrated in FIG. 2. Specifically, when the multicolor toner image formed on the intermediate transfer belt 110 by the superimposition in the default color order is secondarily transferred to a recording sheet, the S toner is positioned uppermost (as a surface layer) among the S. G. R. B. and K toners as illustrated in FIG. 6A. When such a multicolor toner image passes through the fixing device 25 together with a recording sheet SH, a K toner layer, a B toner layer, an R toner layer, a G toner layer, and a transparent toner layer are sequentially laminated to form a multicolor toner image on the surface of the recording sheet SH as illustrated in FIG. 6B. The uppermost transparent toner layer serves to impart glossiness to the color image.

On the other hand, when the special color S is white, a white toner layer is typically formed to form a white background. In this case, if the multicolor toner image is formed by superimposition in the default color order, the white toner layer is positioned uppermost among the K, B, R, G, and white toner layers on the surface of the recording sheet SH, resulting in failure to form a white background. To position the white toner layer lowermost among the K, B, R, G, and white toner layers on the surface of the recording sheet SH so that the white toner layer serves as a background, without changing the order of alignment of the developing stations 18S. 18G. 18R, 18B, and 18K, the intermediate transfer belt 110 is to be rotated twice to from the multicolor toner image.

Figure 7A:
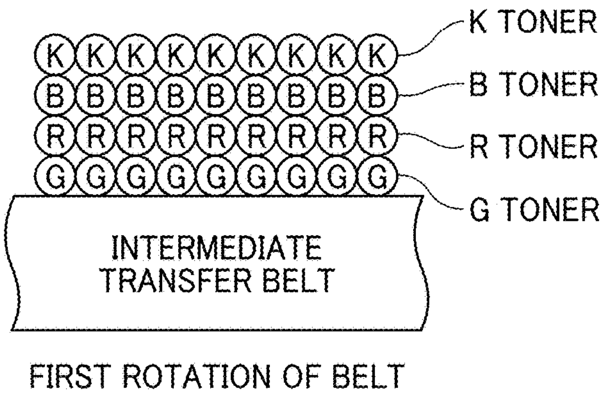
FIGS. 7A to 7C are schematic diagrams illustrating a toner image including a white toner formed in two rotations of an intermediate transfer belt by a copier according to a comparative example.
Figure 7B:
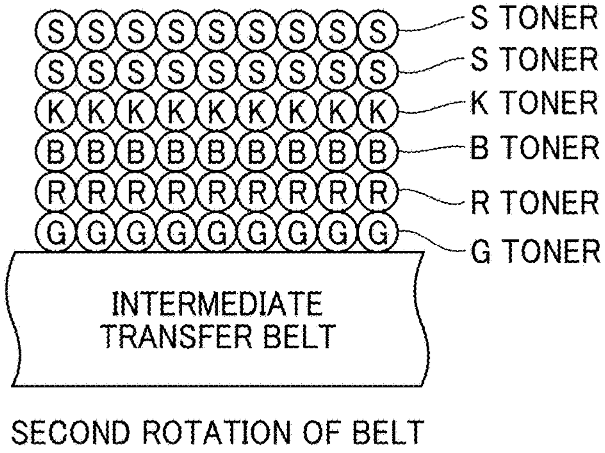

Specifically, in the first rotation of the intermediate transfer belt 110, the G toner image, the R toner image, the B toner image, and the K toner image are sequentially and primarily transferred to the intermediate transfer belt 110 as illustrated in FIG. 7A. In the second rotation of the intermediate transfer belt 110, the white S toner image is primarily transferred onto the K toner image on the intermediate transfer belt 110 as illustrated in FIG. 7B.

Figure 7C:
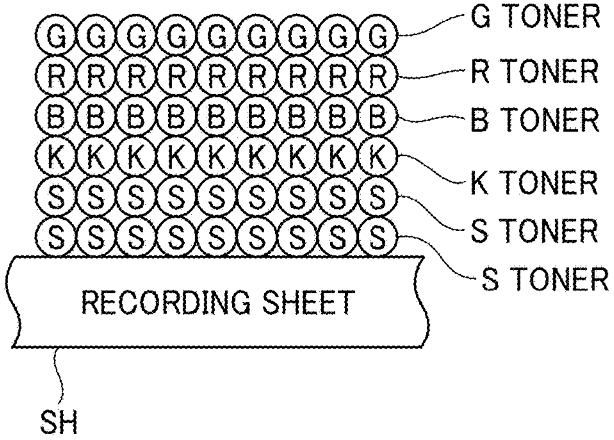
Figure 7D:
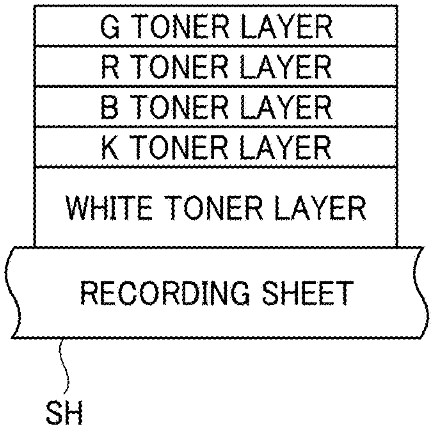
FIG. 7D is a schematic diagram illustrating toner layers of the toner image of FIG. 7C.

After the multicolor toner image on the intermediate transfer belt 110 is secondarily transferred to the recording sheet SH as illustrated in FIG. 7C, the recording sheet SH bearing the multicolor toner image passes through the fixing device 25. As a result, the multicolor toner image is fixed to the recording sheet SH with the white toner layer serving as a lowermost background as illustrated in FIG. 7D.

However, such a configuration reduces productivity by half because the intermediate transfer belt 110 is rotated twice for each output of one sheet. In addition, the polarity of the secondary transfer bias is to be reversed to prevent the transfer of the G toner image, the R toner image, the B toner image, and the K toner image to the secondary transfer roller 23 at the secondary transfer nip after the G toner image, the R toner image, the B toner image, and the K toner image are primarily transferred to the surface of the intermediate transfer belt 110 in the first rotation. To reverse the polarity of the secondary transfer bias, a secondary-transfer-bias power supply that can change the polarity of the output bias is needed, which leads to an increase in cost. Further, the belt cleaning device 90 is to be separated from the surface of the intermediate transfer belt 110 to prevent the belt cleaning device 90 from removing the G toner image, the R toner image, the B toner image, and the K toner image from the surface of the intermediate transfer belt 110 in the first rotation. To separate the belt cleaning device 90 from the surface of the intermediate transfer belt 110, a contact-separation mechanism is needed, which leads to a further increase in cost.

Figure 8A:
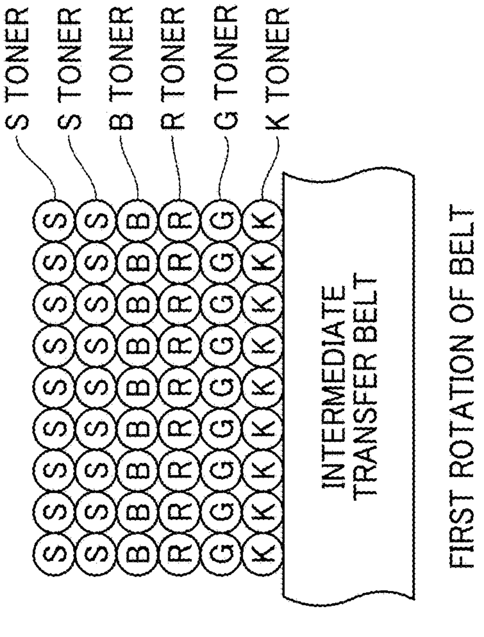
FIGS. 8A and 8B are schematic diagrams illustrating a toner image including a white toner formed in one rotation of an intermediate transfer belt by a copier according to another comparative example.
Figure 8B:
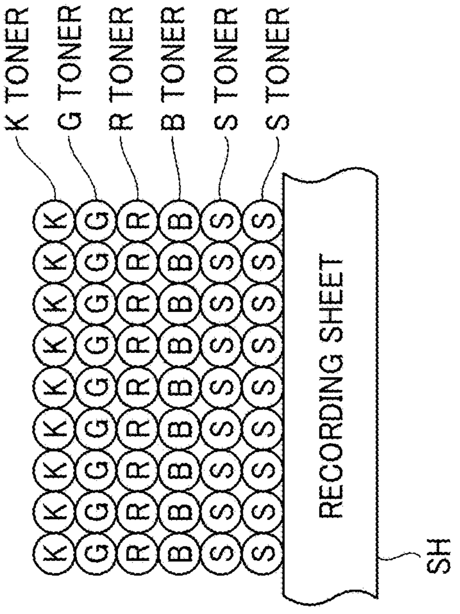
Figure 8C:
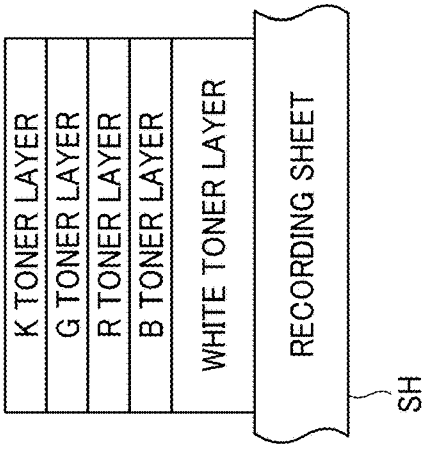
FIG. 8C is a schematic diagram illustrating toner layers of the toner image of FIG. 8B.

When the developing station 18S for S and the developing station 18K for K are replaced with each other, a white background is positioned at the lowermost layer on the recording sheet SH without rotating the intermediate transfer belt 110 twice. Specifically, when the developing station 18S and the developing station 18K are replaced with each other, the K, G, R, B. and S toner images are sequentially superimposed to from a multicolor toner image on the surface of the intermediate transfer belt 110 in the first rotation as illustrated in FIG. 8A. When the multicolor toner image is collectively and secondarily transferred to the recording sheet SH, the multicolor toner image includes the white S toner image at the lowest position on the recording sheet SH as illustrated in FIG. 8B. When the recording sheet SH bearing the multicolor toner image passes through the fixing device 25, the multicolor toner image is fixed to the recording sheet SH with the white toner layer serving as a white background positioned lowermost as illustrated in FIG. 8C.

However, such a configuration has a drawback that it takes time and effort to replace, for example, the developing stations 18.

A detailed description is given below of the drawback. To change the special color S from transparent to white, firstly, the developing station 18S for S at the most upstream unit position (head position) and the developing station 18K for K at the most downstream unit position (final position) need to be replaced with each other. However, this replacement alone causes color mixing. This is because the S toner is reserved in the pre-supply reservoir 55S that supplies the toner to the developing station 18K for K, which has been replaced to the most upstream unit position from the most downstream unit position. On the other hand, the K toner is reserved in the pre-supply reservoir 55K that supplies the toner to the developing station 18S for S, which has been replaced to the most downstream unit position from the most upstream unit position. As a result, color mixing occurs in each of the developing station 18S for S and the developing station 18K for K.

To avoid such color mixing, the pre-supply reservoir 55S that supplies the S toner and the pre-supply reservoir 55K that supplies the K toner need to be replaced with each other, together with the replacement between the developing station 18S for S and the developing station 18K for K. In accordance with this replacement, the toner bottle 51S for the S toner and the toner bottle 51K for the K toner need to be replaced with each other while the bottle drivers 52S and 52K need to be replaced with each other. In short, such replacement work is very troublesome.

To prevent such unfavorable situations, in the copier of the present embodiment, the transfer tube 53S for S and the transfer tube 53K for K have individual lengths as described below. Specifically, in a case where the pre-supply reservoir 55S for S and the pre-supply reservoir 55K for K are replaced with each other so that the pre-supply reservoir 55S is positioned at the most downstream reservoir position and the pre-supply reservoir 55K is positioned at the most upstream reservoir position, without replacing the positions of attachment of bottle-side ends of the transfer tubes 53S and 53K adjacent to the respective toner bottles 51S and 51K, the lengths of the transfer tubes 53S and 53K allow the other ends of the transfer tubes 53S and 53K to reach the pre-supply reservoir 55S at the most downstream reservoir position and the pre-supply reservoir 55K at the most upstream reservoir position, respectively. In other words, when the above-described replacement is performed, one end of the transfer tube 53S for S remains coupled to the bottle driver 52S for S at the fifth bottle position while the other end of the transfer tube 53S reaches the suction pump 54S of the pre-supply reservoir 55S for S at the most downstream reservoir position.

The transfer tube 53S for S has such a length. On the other hand, when the above-described replacement is performed, one end of the transfer tube 53K for K remains coupled to the bottle driver 52K for K at the fourth bottle position while the other end of the transfer tube 53K reaches the suction pump 54K of the pre-supply reservoir 55K for K at the most upstream reservoir position. The transfer tube 53K for K has such a length.

Such a configuration can omit the replacement between the toner bottles 51S and 51K and the replacement between the bottle drivers 52S and 52K, thus reducing the time and effort of the replacement work.

Figure 9:
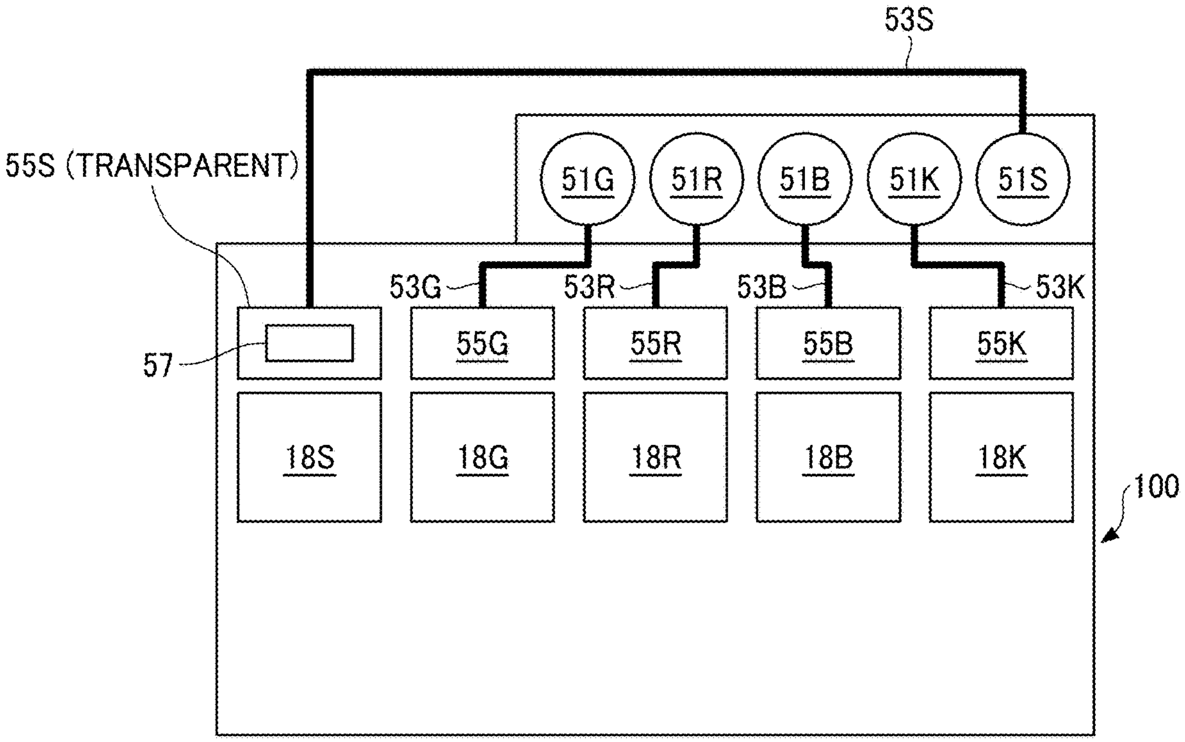
FIG. 9 is a schematic diagram illustrating an example arrangement of developing stations, pre-supply reservoirs, and toner bottles in a copier according to an embodiment of the present disclosure.

FIG. 9 is a diagram illustrating the correct arrangement of the developing stations 18S. 18G. 18R, 18B, and 18K, the pre-supply reservoirs 55S, 55G, 55R, 55B, and 55K, and the toner bottles 51S, 51G, 51R, 51B, and 51K when a transparent toner is used as toner of the special color S.

For the sake of simplicity. FIG. 9 may omit the bottle drivers 52S. 52G, 52R, 52B, and 52K.

When the transparent toner is used as the special color S, as illustrated in FIG. 9, the correct position of the pre-supply reservoir 55S for S is the most upstream reservoir position, whereas the correct position of the developing station 18S for S is the most upstream unit position. On the other hand, the correct position of the pre-supply reservoir 55K for K is the most downstream reservoir position, whereas the correct position of the developing station 18K for K is the most downstream unit position. When each of these four components is placed at the correct position described above, the transfer tube 53S for S is greatly extended from the vicinity of one end of the printer 100 toward the vicinity of the other end of the printer 100 as illustrated in FIG. 9. On the other hand, the transfer tube 53K for K is a relatively short tube that couples the toner bottle 51K (strictly speaking, the bottle driver 52K) and the pre-supply reservoir 55K that are relatively close to each other. However, the actual length of the transfer tube 53K for K is not as short as illustrated in FIG. 9. The transfer tube 53K has a length extendible to a length equivalent to that of the transfer tube 53S for S. In FIG. 9, a surplus area of the entire area of the transfer tube 53K for K is accommodated in the housing of the printer 100.

Figure 10:
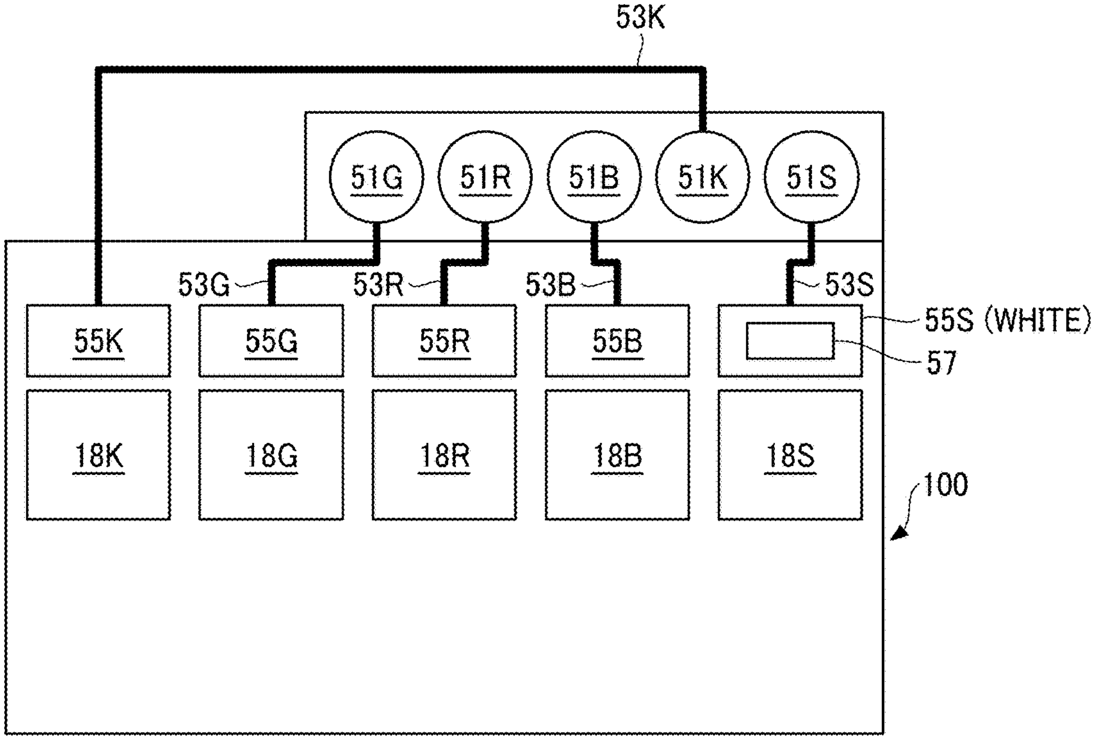
FIG. 10 is a schematic diagram illustrating another example arrangement of the developing stations, the pre-supply reservoirs, and the toner bottles in the copier of FIG. 9.

FIG. 10 is a diagram illustrating the correct arrangement of the developing stations 18S, 18G, 18R, 18B, and 18K, the pre-supply reservoirs 55S, 55G, 55R, 55B, and 55K, and the toner bottles 51S, 51G, 51R, 51B, and 51K when white is used as the special color S.

For the sake of simplicity. FIG. 10 may omit the bottle drivers 52S, 52G. 52R, 52B, and 52K.

When white is used as the special color S, as illustrated in FIG. 10, the correct position of the pre-supply reservoir 55S for S is the most downstream reservoir position, whereas the correct position of the developing station 18S for S is the most downstream unit position. On the other hand, the correct position of the pre-supply reservoir 55K for K is the most upstream reservoir position, whereas the correct position of the developing station 18K for K is the most upstream unit position. When each of these four components is placed at the correct position described above, the transfer tube 53K for K is greatly extended from the vicinity of one end of the printer 100 toward the vicinity of the other end of the printer 100 as illustrated in FIG. 10, contrary to the case where the transparent toner is used. On the other hand, the transfer tube 53S for S is a relatively short tube that couples the toner bottle 51S (strictly speaking, the bottle driver 52S) and the pre-supply reservoir 55S that are relatively close to each other. A surplus area of the entire area of the transfer tube 53S for S is accommodated in the housing of the printer 100.

In the example illustrated in FIG. 10, only the pre-supply reservoir 55S for S and the pre-supply reservoir 55K for K are attachable to and detachable from the main body of the printer 100 with simple operation by an operator. The pre-supply reservoirs 55 are attachable and detachable only at the most upstream and most downstream reservoir positions among the most upstream, second, third, fourth, and most downstream reservoir positions. Such a configuration prevents the pre-supply reservoirs 55 from being erroneously positioned because the pre-supply reservoirs 55 that do not need to be replaced are not attachable or detachable with simple operation by the operator. For example, without a special tool, the operator can attach and detach the pre-supply reservoirs 55S and 55K to and from the main body of the printer 100. However, in another embodiment of the present disclosure, all the pre-supply reservoirs 55 including the pre-supply reservoir 55G for G, the pre-supply reservoir 55R for R. and the pre-supply reservoir 55B for B may be attachable to and detachable from the main body of the printer 100 with simple operation by the operator.

As illustrated in FIGS. 9 and 10, a dual in-line package (DIP) switch board 57 serving as transmitting means is fixed to only the pre-supply reservoir 55S for S among the pre-supply reservoirs 55S, 55G, 55R, 55B, and 55K for S, G, R, B, and K. As illustrated in FIG. 5A (FIG. 5), the DIP switch board 57 includes a first DIP switch 57*a*, a second DIP switch 57*b*, a third DIP switch 57*c*, and a fourth DIP switch 57*d*. The DIP switch board 57 further includes terminals corresponding to the four DIP switches, an input terminal, and a special-color signal output terminal. However, in another embodiment of the present disclosure, the DIP switch boards 57 may be fixed to all the pre-supply reservoirs 55 or may be fixed to the four pre-supply reservoirs 55 except for the pre-supply reservoir 55K for K.

A first connector 71 is placed at the most upstream reservoir position in the printer 100. A second connector 72 is placed at the most downstream reservoir position of the reservoir. Each of the first connector 71 and the second connector 72 includes six terminals that can be individually engaged with the respective six terminals of the dip switch board 57.

When the pre-supply reservoir 55S for S is placed at the most upstream reservoir position, the six terminals of the DIP switch board 57 fixed to the pre-supply reservoir 55S are engaged with the six terminals of the first connector 71. By contrast, when the pre-supply reservoir 55S for S is placed at the most downstream reservoir position, the six terminals of the DIP switch board 57 fixed to the pre-supply reservoir 55S are engaged with the six terminals of the second connector 72. FIG. 5A (FIG. 5) illustrates the terminals of the first connector 71 fixed at the most upstream reservoir position engaged with the terminals of the DIP switch board 57 of the pre-supply reservoir 55S placed at the most upstream reservoir position.

The determination circuit 80*e* of the main controller 80 outputs test signals to the output terminal of the first connector 71 and the output terminal of the second connector 72. When the DIP switch board 57 and the first connector 71 are engaged with each other, the test signal is transmitted from the input terminal of the DIP switch board 57 to each of the four DIP switches (i.e., the first DIP switch 57*a*, the second DIP switch 57*b*, the third DIP switch 57*c*, and the fourth DIP switch 57*d*) and the special-color signal output terminal in the DIP switch board 57.

The test signal transmitted to the first DIP switch 57*a* of the DIP switch board 57 is transmitted to a first output terminal of the DIP switch board 57 as a first switching signal only when the first DIP switch 57*a* is turned on. The first switching signal then returns to the determination circuit 80*e* of the main controller 80 via a first input terminal of the first connector 71. Similarly, the test signal transmitted to the second DIP switch 57*b* returns to the determination circuit 80*e* of the main controller 80 as a second switching signal only when the second DIP switch 57*b* is turned on. The test signal transmitted to the third DIP switch 57*c* returns to the determination circuit 80*e* of the main controller 80 as a third switching signal only when the third DIP switch 57*c* is turned on. The test signal transmitted to the fourth DIP switch 57*d* returns to the determination circuit 80*e* of the main controller 80 as a fourth switching signal only when the fourth DIP switch 57*d* is turned on. The test signal transmitted to the special-color signal output terminal returns to the determination circuit 80*e* as a most upstream special-color signal.

By contrast, when the pre-supply reservoir 55S for S is placed at the most downstream reservoir position, the DIP switch board 57 of the pre-supply reservoir 55S is engaged with the second connector 72 fixed at the most downstream reservoir position. Then, the test signal output from the determination circuit 80*e* of the main controller 80 is input from the output terminal of the second connector 72 to the input terminal of the DIP switch board 57. The test signal is then transmitted to each of the four DIP switches (i.e., the first DIP switch 57*a*, the second DIP switch 57*b*, the third DIP switch 57*c*, and the fourth DIP switch 57*d*) and the special-color signal output terminal in the DIP switch board 57. As described above, the test signal transmitted to each of the first DIP switch 57*a*, the second DIP switch 57*b*, the third DIP switch 57*c*, and the fourth DIP switch 57*d* then returns to the determination circuit 80*e* of the main controller 80 as a switching signal only when the corresponding DIP switch is turned on. The test signal transmitted to the special-color signal output terminal returns to the determination circuit 80*e* as a most downstream special-color signal.

When receiving the most upstream special-color signal, the determination circuit 80*e* ascertains that the pre-supply reservoir 55S for S is placed at the most upstream reservoir position. By contrast, when receiving the most downstream special-color signal, the determination circuit 80*e* ascertains that the pre-supply reservoir 55S for S is placed at the most downstream reservoir position. The determination circuit 80*e* specifically determines what the special color is, based on the received combination of signals among the first switching signal, the second switching signal, the third switching signal, and the fourth switching signal.

Table 1 below presents a special-color data table stored in the flash memory 80*b* of the main controller 80.

TABLE 1

| SIGNALS FOR DIP SWITCH | | | | | |
|---|---|---|---|---|---|
| FIRST SWITCH | SECOND SWITCH | THIRD SWITCH | FOURTH SWITCH | SPECIAL COLOR | POSITION |
| LOW (ON) | LOW (ON) | LOW (ON) | LOW (ON) | SPECIAL COLOR 1 | MOST UPSTREAM |
| LOW (ON) | LOW (ON) | LOW (ON) | HIGH (OFF) | SPECIAL COLOR 2 | MOST UPSTREAM |
| LOW (ON) | LOW (ON) | HIGH (OFF) | LOW (ON) | SPECIAL COLOR 3 | MOST UPSTREAM |
| LOW (ON) | LOW (ON) | HIGH (OFF) | HIGH (OFF) | SPECIAL COLOR 4 | MOST UPSTREAM |
| LOW (ON) | HIGH (OFF) | LOW (ON) | LOW (ON) | SPECIAL COLOR 5 | MOST UPSTREAM |
| LOW (ON) | HIGH (OFF) | LOW (ON) | HIGH (OFF) | SPECIAL COLOR 6 | MOST UPSTREAM |
| LOW (ON) | HIGH (OFF) | HIGH (OFF) | LOW (ON) | SPECIAL COLOR 7 | MOST UPSTREAM |
| LOW (ON) | HIGH (OFF) | HIGH (OFF) | HIGH (OFF) | SPECIAL COLOR 8 | MOST DOWNSTREAM |
| HIGH (OFF) | LOW (ON) | LOW (ON) | LOW (ON) | SPECIAL COLOR 9 | MOST DOWNSTREAM |
| HIGH (OFF) | LOW (ON) | LOW (ON) | HIGH (OFF) | SPECIAL COLOR 10 | MOST DOWNSTREAM |
| HIGH (OFF) | LOW (ON) | HIGH (OFF) | LOW (ON) | SPECIAL COLOR 11 | MOST DOWNSTREAM |
| HIGH (OFF) | LOW (ON) | HIGH (OFF) | HIGH (OFF) | SPECIAL COLOR 12 | MOST DOWNSTREAM |
| HIGH (OFF) | HIGH (OFF) | LOW (ON) | LOW (ON) | SPECIAL COLOR 13 | MOST DOWNSTREAM |
| HIGH (OFF) | HIGH (OFF) | LOW (ON) | HIGH (OFF) | SPECIAL COLOR 14 | MOST DOWNSTREAM |
| HIGH (OFF) | HIGH (OFF) | HIGH (OFF) | LOW (ON) | SPECIAL COLOR 15 | MOST DOWNSTREAM |
| HIGH (OFF) | HIGH (OFF) | HIGH (OFF) | HIGH (OFF) | ALL OF SPECIAL COLORS 1 TO 15 | EITHER MOST UPSTREAM OR MOST DOWNSTREAM IS FINE |

The DIP switch board 57 as the transmitting means can transmit sixteen kinds of information by combinations of ON and OFF of the four DIP switches (i.e., the first DIP switch 57*a*, the second DIP switch 57*b*, the third DIP switch 57*c*, and the fourth DIP switch 57*d*). The determination circuit 80*e* of the main controller 80 can specify a specific special color, based on which one of the sixteen combinations corresponds to the actual combination. As illustrated in Table 1, the special-color data table associates positional information with each of the sixteen combinations. The determination circuit 80*e* can also specify the position of the pre-supply reservoir 55S for S between the two reservoir positions (i.e., the most upstream reservoir position and the most downstream reservoir position), based on which one of the above-described sixteen combinations corresponds to the actual combination. In addition, the determination circuit 80*e* can specify the position of the developing station 18S for S between the two unit positions (i.e., the most upstream unit position and the most downstream unit position). The determination circuit 80*e* then transmits the positional information to the CPU 80*a*.

The combination in which all the four switches (i.e., the first DIP switch 57*a*, the second DIP switch 57*b*, the third DIP switch 57*c*, and the fourth DIP switch 57*d*) are OFF, among the combinations of ON and OFF of the four DIP switches, is used for inspection of the circuit of the DIP switch board 57 at the time of shipment from the factory. For this reason, the DIP switch board 57 represents fifteen colors as specific special colors. Transparent of the fifteen colors is associated with the most upstream position in the special-color data table. By contrast, white is associated with the most downstream position in the special-color data table.

In the copier of the present embodiment, the determination circuit 80*e* can determine as below, based on the special-color data table and the switching signal transmitted from the DIP switch board 57. In other words, the determination circuit 80*e* can determine whether each of the pre-supply reservoirs 55S and 55K is placed at the correct position after the pre-supply reservoirs 55S and 55K are replaced with each other. Accordingly, an unfavorable situation can be prevented in which only the developing station 18K for K and the developing station 18S for S are replaced with each other and the replacement work of the pre-supply reservoirs 55K and 55S is forgotten.

When the special color toner is changed from one special color toner to another special color toner, the developing station 18S and the pre-supply reservoir 55S also need to be changed to dedicated ones to be used for the color after the change. For this reason, the control panel 500 includes a special-color change key. The operator presses the special-color change key to cause the main controller 80 to ascertain that the special color is to be changed.

Figure 11A:
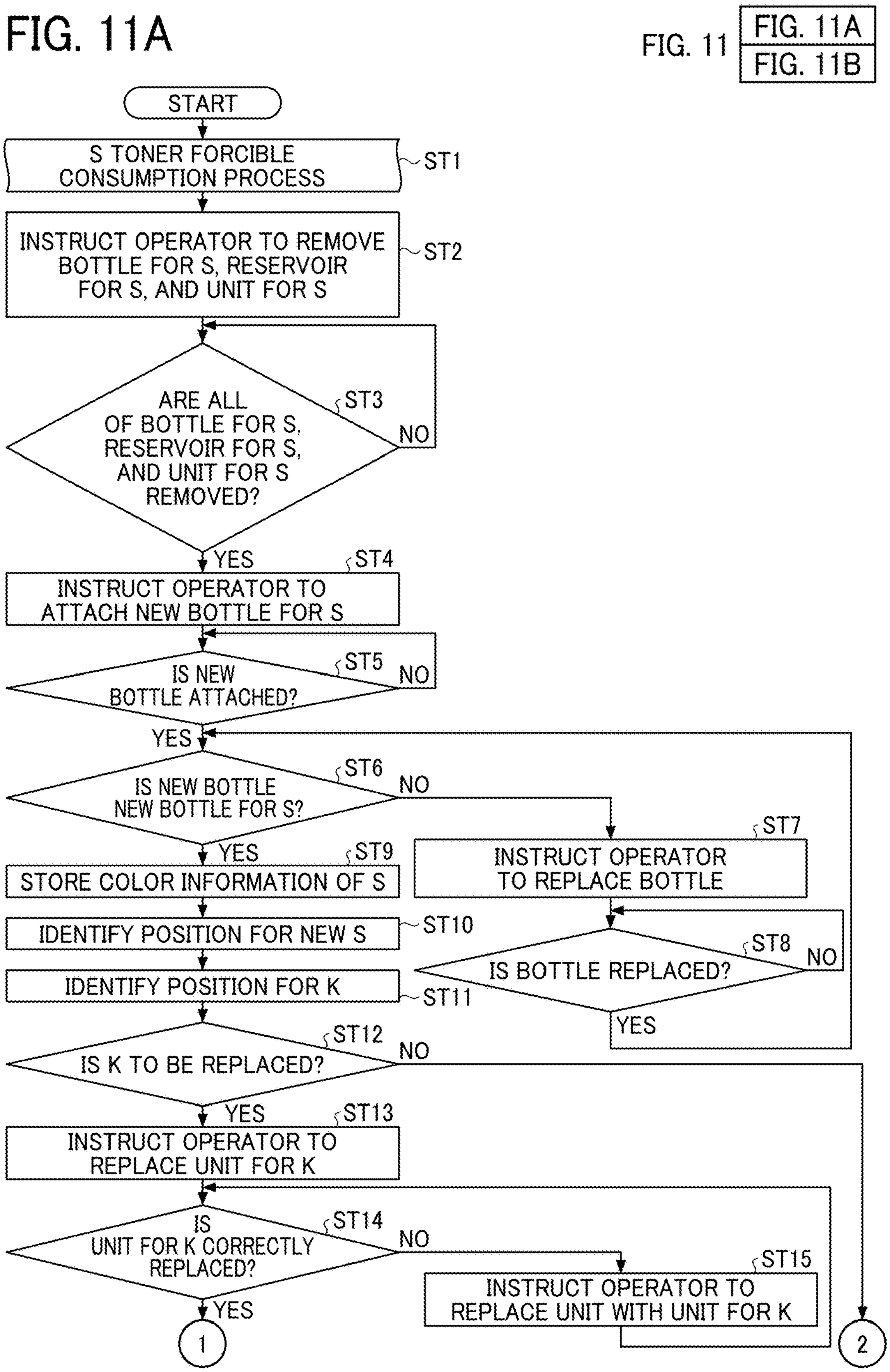
FIGS. 11A and 11B (FIG. 11) are flowcharts illustrating a process performed by a copier according to an embodiment of the present disclosure.
Figure 11B:
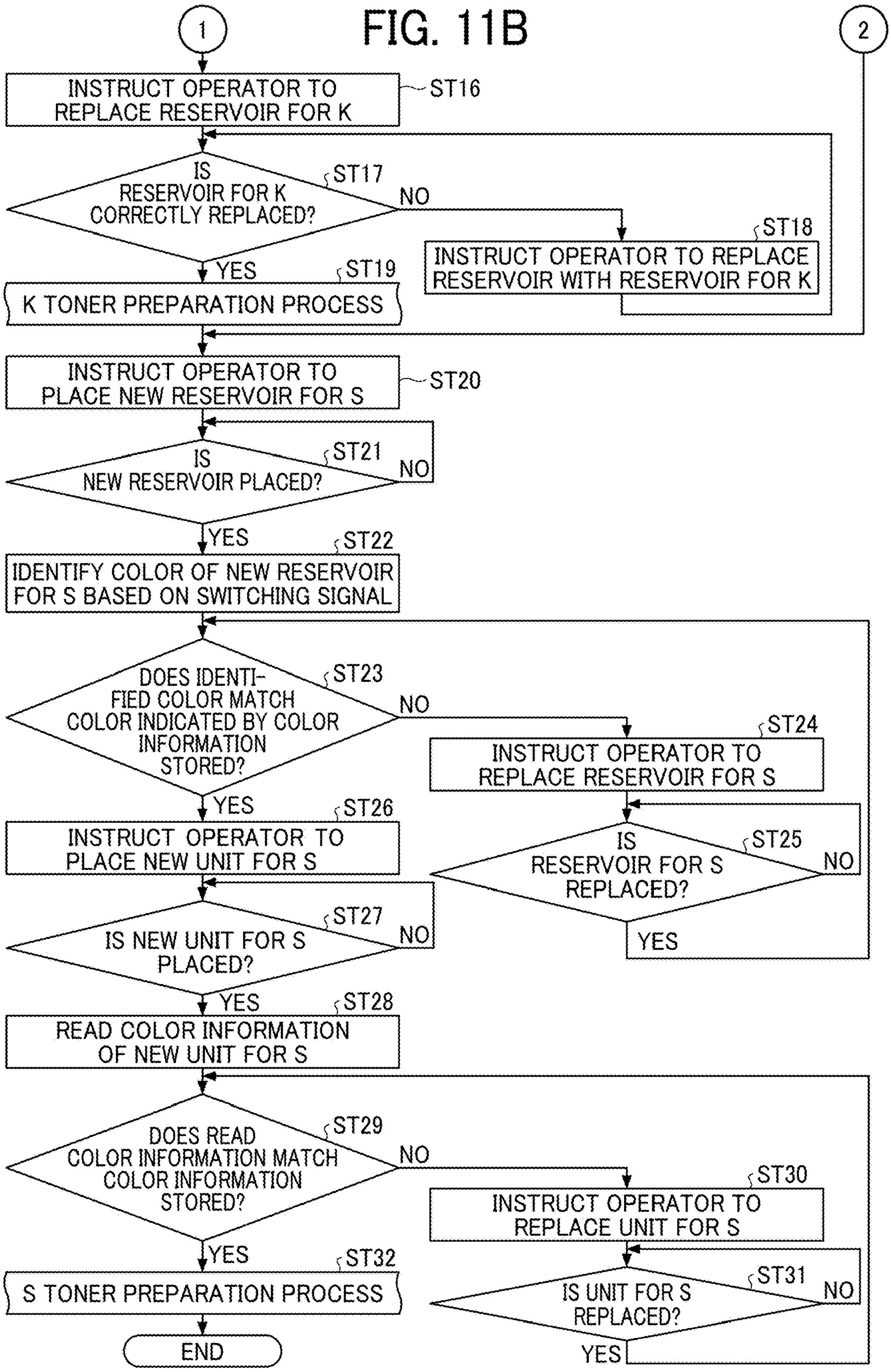

FIGS. 11A and 11B (FIG. 11) are flowcharts illustrating a special-color changing process performed by the main controller 80.

The main controller 80 starts the special-color changing process with an S toner forcible consumption process as step ST1. The S toner forcible consumption process is a process for transferring substantially the entire amount of the S toner stored in the pre-transfer reservoir of the bottle driver 52S for S to the pre-supply reservoir 55S for S. Simple transfer of the S toner may cause overflow of the S toner from the pre-supply reservoir 55S to which the S toner is transferred. To prevent the overflow, the main controller 80 transfers, while forming an entire solid image of S, the S toner from the pre-transfer reservoir of the bottle driver 52S to the pre-supply reservoir 55S based on the decrease, caused by the image formation, in the amount of S toner stored in the pre-supply reservoir 55S. The main controller 80 performs the S toner forcible consumption process until the driving time of the suction motor 58S for S after the start of the S toner forcible consumption process reaches a given threshold.

In the S toner forcible consumption process, a reverse bias having a polarity opposite to that of the normal secondary transfer bias is output from the secondary-transfer-bias power supply. As a result, without transferring the entire solid image of S to the secondary transfer roller 23 at the secondary transfer nip, the entire solid image of S is output from the secondary transfer nip while adhering to the intermediate transfer belt 110 and is removed from the surface of the intermediate transfer belt 110 by the belt cleaning device 90.

After completing the S toner forcible consumption process, in step ST2, the main controller 80 displays, on the control panel 500, a message instructing the operator to remove the toner bottle 51S, the pre-supply reservoir 55S, and the developing station 18S for S.

In step ST3, the main controller 80 determines whether all the toner bottle 51S, the pre-supply reservoir 55S, and the developing station 18S are removed from the printer 100 by the operator. When the toner bottle 51S, the pre-supply reservoir 55S, or the developing station 18S is not removed (NO in step ST3), the main controller 80 repeats the determination of step ST3. By contrast, when detecting that all the toner bottle 51S, the pre-supply reservoir 55S, and the developing station 18S are removed from the printer 100 by the operator (YES in step ST3), in step ST4, the main controller 80 displays, on the control panel 500, a message instructing the operator to attach a new toner bottle 51S for S to the bottle driver 52S.

In step ST5, the main controller 80 determines whether a new toner bottle 51 is attached to the bottle driver 52S for S based on whether new ID information is transmitted from the bottle communication circuit 52*a*S. When the new toner bottle 51 is not attached to the bottle driver 52S (NO in step ST5), the main controller 80 waits until the new toner bottle 51 is attached to the bottle driver 52S, specifically, until the new ID information is transmitted from the bottle communication circuit 52*a*S. When the new toner bottle 51 is attached to the bottle driver 52S (YES in step ST5), in step ST6, the main controller 80 determines whether the color information transmitted from the bottle communication circuit 52*a*S is color information of a new special color. When the color information is not color information of the new special color (NO in step ST6), in step ST7, the main controller 80 displays, on the control panel 500, a message instructing the operator to replace the toner bottle 51 attached to the bottle driver 52S for S with anew toner bottle 51S for S. In step ST8, the main controller 80 determines whether the operator has replaced the toner bottle 51 with a new toner bottle 51S for the bottle driver 52S for S in response to the message (instruction). When the operator has not replaced the toner bottle 51 with the new toner bottle 51S (NO in step ST8), the main controller 80 repeats the determination of step ST8. By contrast, when detecting that the operator has replaced the toner bottle 51 with the new toner bottle 51S (YES in step ST8), the process returns to step ST6 described above.

On the other hand, when determining that the toner bottle 51S attached to the bottle driver 52S for S corresponds to the new special color, in other words, when the color information is the color information of the new special color (YES in step ST6), in step ST9, the main controller 80 stores the color information of the new special color S transmitted from the bottle communication circuit 52*a*S for S.

In step ST10, the main controller 80 identifies the positional information corresponding to the color information from the special-color data table described above.

In step ST11, the main controller 80 identifies the position for K, based on the identification result. More specifically, when the position corresponding to the new special color S is the most upstream position, the main controller 80 identifies the position for K as the most downstream position opposite to the most upstream position. By contrast, when the position corresponding to the new special color S is the most downstream position, the main controller 80 identifies the position for K as the most upstream position opposite to the most downstream position.

In step ST12, the main controller 80 determines whether the pre-supply reservoir 55K and the developing station 18K for K are to be replaced. Specifically, when the position for K identified immediately before is different from the current position for K, the main controller 80 determines that the pre-supply reservoir 55K and the developing station 18K are to be replaced (YES in step ST12). By contrast, when the position for K identified immediately before is the same as the current position for K, the main controller 80 determines that the pre-supply reservoir 55K and the developing station 18K are not to be replaced (NO in step ST12).

When the pre-supply reservoir 55K and the developing station 18K are to be replaced (YES in step ST12), the main controller 80 performs the processing from step ST13 to step ST19 and then performs the processing from step ST20 to step ST32. By contrast, when the pre-supply reservoir 55K and the developing station 18K are not to be replaced (NO in step ST12), the main controller 80 performs the processing from step ST20 to step ST32 without performing the processing from step ST13 to step ST19. In the following description, the former processing from step ST13 to step ST19 may be referred to as K replacement processing. The latter processing from step ST20 to step ST32 may be referred to as S replacement processing.

In the K replacement processing, firstly, in step ST13, the main controller 80 displays, on the control panel 500, a message instructing the operator to replace the developing station 18K for K. Specifically, when the current position for K is the most upstream position, the main controller 80 displays a message instructing the operator to move the developing station 18K from the most upstream unit position to the most downstream unit position. By contrast, when the current position for K is the most downstream position, the main controller 80 displays a message instructing the operator to move the developing station 18K from the most downstream unit position to the most upstream unit position.

In step ST14, the main controller 80 determines whether the developing station 18K for K is correctly replaced. Specifically, when detecting a new developing station 18 is placed at the unit position to which the developing station 18K is to be moved, the main controller 80 reads color information from the data memory of the toner concentration sensor 4*e* of the new developing station 18. When the color information is color information of K, the main controller 80 determines that the developing station 18K for K is correctly replaced (YES in step ST14). By contrast, when the color information is not the color information of K, the main controller 80 determines that the developing station 18K for K is not correctly replaced (NO in step ST14). In this case, since the developing station 18 placed at the unit position is not the developing station 18K for K, in step ST15, the main controller 80 displays a message instructing the operator to replace the developing station 18 with the developing station 18K for K. The process then returns to step ST14.

When the developing station 18K for K is correctly replaced (YES in step ST14), in step ST16, the main controller 80 displays, on the control panel 500, a message instructing the operator to replace the pre-supply reservoir 55K for K. Specifically, when the current position for K is the most upstream position, the main controller 80 displays a message instructing the operator to move the pre-supply reservoir 55K from the most upstream reservoir position to the most downstream reservoir position. By contrast, when the current position for K is the most downstream position, the main controller 80 displays a message instructing the operator to move the pre-supply reservoir 55K from the most downstream reservoir position to the most upstream reservoir position.

In step ST17, the main controller 80 determines whether the pre-supply reservoir 55K is correctly replaced. Specifically, when a reservoir detection signal is transmitted from a reservoir sensor placed at the reservoir position to which the pre-supply reservoir 55K is to be moved, the main controller 80 determines whether the special-color signal derived from the DIP switch board 57 is transmitted from the reservoir position. When the special-color signal (the most upstream special-color signal or the most downstream special-color signal) is transmitted, the pre-supply reservoir 55S for S is placed, instead of the pre-supply reservoir 55K, at the reservoir position to which the pre-supply reservoir 55K is to be moved. For this reason, the main controller 80 determines that the pre-supply reservoir 55K is not correctly replaced (NO in step ST17). In this case, since the pre-supply reservoir 55S for S is erroneously placed, instead of the pre-supply reservoir 55K, at the reservoir position to which the pre-supply reservoir 55K is to be moved, in step ST18, the main controller 80 displays, on the control panel 500, a message instructing the operator to replace the pre-supply reservoir 55S with the pre-supply reservoir 55K for K. The process then returns to step ST17.

When the pre-supply reservoir 55S for S is erroneously placed, for example, in addition to or instead of displaying an instruction to the operator on the screen, an action may be performed to notify the operator that the pre-supply reservoir 55S is erroneously placed. For example, a lamp may be lighted to notify the operator that an error has occurred. When the pre-supply reservoir 55 is erroneously placed as described above, the toner is not conveyed to prevent the mixture of different kinds of toner.

On the other hand, when the special-color signal derived from the DIP switch board 57 is not transmitted from the reservoir position to which the pre-supply reservoir 55K is to be moved, the main controller 80 determines that the pre-supply reservoir 55K for K is correctly replaced (YES in step ST17). In this case, in step ST19, the main controller 80 performs a K toner preparation process. In the K toner preparation process, firstly, the main controller 80 drives the bottle driving motor 52*c*K for K to output the toner from the toner bottle 51K for K to the pre-transfer reservoir of the bottle driver 52K. The main controller 80 then drives the suction motor 58K for K to start transferring the K toner from the pre-transfer reservoir to the pre-supply reservoir 55K for K. Based on the detection of the upper level by the pre-supply upper-limit sensor 59K of the pre-supply reservoir 55K, the main controller 80 stops driving the suction motor 58K. Based on the detection of the upper level by the pre-transfer upper-limit sensors 52*b*K of the bottle driver 52K, the main controller 80 stops driving the bottle driving motor 52*c*K.

After performing the K toner preparation process as described above, the main controller 80 starts the S replacement processing.

In the S replacement processing, firstly, in step ST20, the main controller 80 displays, on the control panel 500, a message instructing the operator to place a new pre-supply reservoir 55S for S.

In step ST21, the main controller 80 determines whether the new pre-supply reservoir 55S is placed. When the new pre-supply reservoir 55S is not placed (NO in step ST21), the main controller 80 repeats the determination of step ST21. By contrast, when detecting that the new pre-supply reservoir 55S is placed (YES in step ST21), in step ST22, the main controller 80 identifies the color of the special color S based on a combination of ON and OFF of the four switching signals transmitted from the DIP switch board 57 and the above-described special-color data table.

In step ST23, the main controller 80 determines whether the color of the special color S matches the color indicated by the color information stored in step ST9. When the color of the special color S does not match the color indicated by the color information stored in step ST9 (NO in step ST23), in step ST24, the main controller 80 displays, on the control panel 500, a message instructing the operator to replace the pre-supply reservoir 55S for S with one corresponding to the same color as the color indicated by the color information stored in the S9. In step ST25, the main controller 80 determines whether the pre-supply reservoir 55S is replaced. When the pre-supply reservoir 55S is not replaced (NO in step ST25), the main controller 80 repeats the determination of step ST25. By contrast, when the pre-supply reservoir 55S is replaced (YES in step ST25), the process returns to step ST23.

When the color of the pre-supply reservoir 55S for S newly placed matches the color indicated by the color information stored in step ST9 (YES in step ST23), in step ST26, the main controller 80 displays, on the control panel 500, a message instructing the operator to place a new developing station 18S for S.

In step ST27, the main controller 80 determines whether the new developing station 18S is placed. When the new developing station 18S is not placed (NO in step ST27), the main controller 80 repeats the determination of step ST27. By contrast, when detecting that the new developing station 18S is placed (YES in step ST27), in step ST28, the main controller 80 reads the color information from the data memory of the toner concentration sensor 4*e*S on board of the developing station 18S.

In step ST29, the main controller 80 determines whether the read color information matches the color information stored in step ST9. When the read color information does not match the color information stored in step ST9 (NO in step ST29), in step ST30, the main controller 80 displays, on the control panel 500, a message instructing the operator to replace the developing station 18S for S with one corresponding to the same color as the color indicated by the color information stored in step ST9. In step ST31, the main controller 80 determines whether the developing station 18S is replaced. When the developing station 18S is not replaced (NO in step ST31), the main controller 80 repeats the determination of step ST31. By contrast, when the developing station 18S is replaced (YES in step ST31), the process returns to step ST29.

When the color of the developing station 18S for S newly placed matches the color indicated by the color information stored in step ST9 (YES in step ST29), in step ST32, the main controller 80 performs an S toner preparation process.

Thus, the special-color changing process is completed. The S toner preparation process is performed on the S toner like the K toner preparation process described above.

In the copier that performs the special-color changing process described above, a combination of the first connector 71, the second connector 72, the DIP switch board 57, and the main controller 80 serves as acquiring means that acquires color information of the toner stored in the reservoir at the position where the reservoir is placed.

The main controller 80 also serves as determining means that determines whether each reservoir is at a correct position, based on the color information acquired by the acquiring means.

When the position for K is to be changed, the operator easily ascertains that the developing station 18K is to be moved to a unit position as a new movement destination. On the other hand, the operator may forget to move the pre-supply reservoir 55K. Since the need to change the position for K arises from the change of the special color S from one color to another color, the pre-supply reservoir 55S for S is also to be moved from the current reservoir position to a reservoir position as anew movement destination. However, the operator may forget to move the pre-supply reservoir 55S.

To prevent the operator from forgetting to move the pre-supply reservoir 55S, in the copier of the present embodiment, in step ST17 described above, the main controller 80 determines whether the pre-supply reservoir 55K for K is correctly replaced. In step ST23 described above, the main controller 80 determines whether the color of the pre-supply reservoir 55S for S newly placed matches the color indicated by the color information stored in step ST9. Such a configuration prevents the occurrence of color mixture that may be caused by the operator instructing a print job while forgetting to replace the pre-supply reservoir 55S for S or the pre-supply reservoir 55K for K.

Although the white toner and the transparent toner have been described above as the special color toner, the present disclosure is also applicable to a case where various types of special color toner such as a metallic color toner and a fluorescent color toner are used as the special color toner. Although the color information of toner has been described above as the information that is determined, any information may be acquired instead of the color information provided that the color of the toner can be distinguished based on the information of not only the color but also, for example, an additive of the toner or the difference in physical property value of the toner.

Referring to FIGS. 12A to 12F, a description is given of printed materials produced by the copier according to the present embodiment.

FIGS. 12A to 12F illustrate three examples of printed materials on which an invisible color image is printed by the copier described above.

Figure 12A:
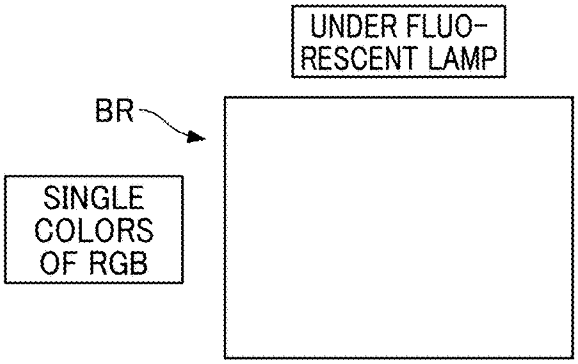
FIGS. 12A to 12F are diagrams illustrating three examples of printed materials produced by a copier according to an embodiment of the present disclosure.
Figure 12B:
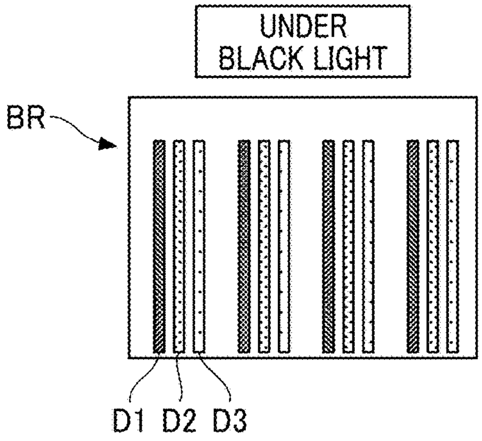
Figure 12C:
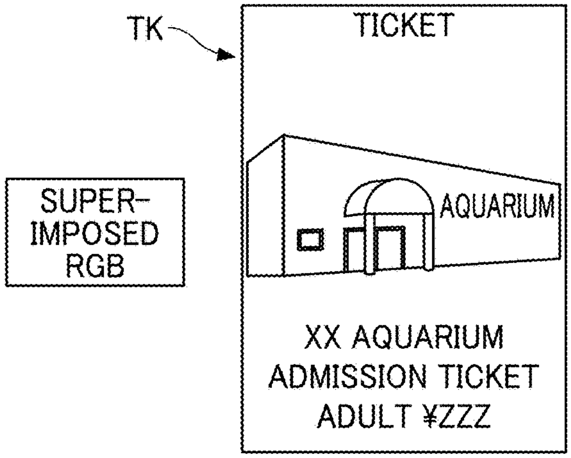
Figure 12D:
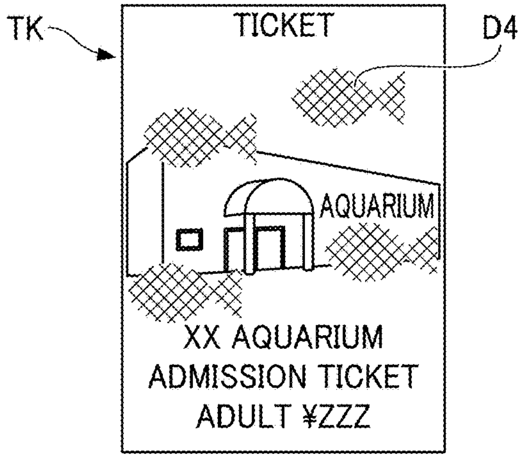
Figure 12E:
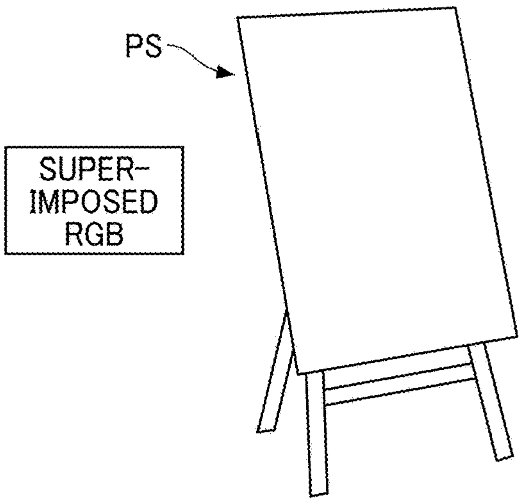
Figure 12F:
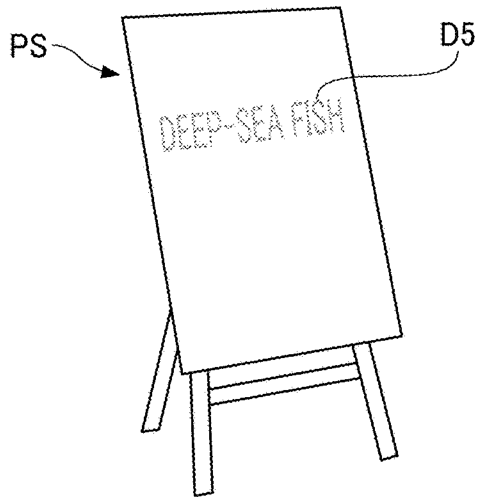

Specifically. FIGS. 12A and 12B are plan views of the brochure BR including, as a cover, a piece of paper on which an invisible single-color red image D1, an invisible single-color green image D2, and an invisible single-color blue image D3 are printed with the R toner, G toner, and the B toner, respectively, so as not to overlap each other. FIGS. 12C and 12D are plan views of the ticket TK, which is a strip-shaped sheet on which an invisible full-color image D4 is printed with the R toner, the G toner, and the B toner superimposed one atop another. FIGS. 12E and 12F are perspective views of a standing signboard to which the poster PS is stuck. The poster PS is a large piece of paper on which invisible-color characters D5 are printed with the R toner, the G toner, and the B toner superimposed one atop another. The standing signboard may be called a floor-standing poster.

More specifically, FIG. 12A illustrates the brochure BR placed under a fluorescent lamp (under visible light), whereas FIG. 12B illustrates the brochure BR placed under a black light (under invisible light). For clarity. FIG. 12A may omit, for example, characters or patterns that are visible under visible light. FIG. 12C illustrates the ticket TK placed under the fluorescent lamp (under visible light), whereas FIG. 12D illustrates the ticket TK placed under the black light (under invisible light). FIG. 12E illustrates the standing signboard (the poster PS) placed under the fluorescent light (under visible light), whereas FIG. 12F illustrates the standing signboard (the poster PS) placed under the black light (under invisible light). For clarity, FIG. 12E may omit, for example, characters or patterns that are visible under visible light.

In the examples illustrated in FIGS. 12A to 12F, the black light is an electric lamp that emits ultraviolet light of a first wavelength (for example, 360 nm), which is a wavelength included in an excitation wavelength range of an invisible color toner. Under the black light, the luminescence intensity of the invisible color toner gets weaker (lower) in the order of the B toner, the R toner, and the G toner. For this reason, in the copier described above, the developing stations 18 related to the invisible color toner are arranged in the order of the developing station 18G, the developing station 18R, and the developing station 18B in the direction of rotation of the intermediate transfer belt 110 as illustrated in FIG. 2. When an invisible color image is formed on a print medium with the G toner, the R toner, and the B toner superimposed one atop another, the color of the invisible color image is optimized because the B toner having a strongest (highest) luminescence intensity is positioned closest to the print medium while the G toner having a weakest (lowest) luminescence intensity is positioned farthest from the print medium. In other words, as will be described later with reference to FIG. 18, if the invisible color toner having a relatively weak (low) luminescence intensity is positioned closer to the print medium than the invisible color toner having a relatively strong (high) luminescence intensity, coloring of the invisible color toner having a relatively weak (low) luminescence intensity is undesirably limited by the invisible color toner having a relatively strong (high) luminescence intensity.

The black light may emit, for example, ultraviolet light of a second wavelength (for example, 352 nm) different from the first wavelength. In this case, unlike the case where the black light emits ultraviolet light of the first wavelength, the luminescence intensity of the invisible color toner gets weaker (lower) in the order of, for example, the R toner, the B toner, and the G toner. For this reason, when the printed material is assumed to be visually recognized under the black light that emits the ultraviolet light of the second wavelength, the developing station 18R and the developing station 18B may be replaced with each other between their respective unit positions in the copier described above. In this case, when an invisible color image is formed on a print medium with the R toner and the B toner superimposed one atop another, the color of the invisible color image is optimized without undesirable limitation to the coloring of the B toner because the R toner having a relatively strong (high) luminescence intensity is positioned closer to the print medium than the B toner having a relatively weak (low) luminescence intensity.

As described above, the brochure BR, the ticket TK, and the poster PS as the printed materials produced by the copier of the present embodiment can bear an image (invisible color image) that is visible under the black light and invisible under the fluorescent light. Accordingly, a creator who creates such printed materials can deliver various performances with the printed materials.

Figure 13:
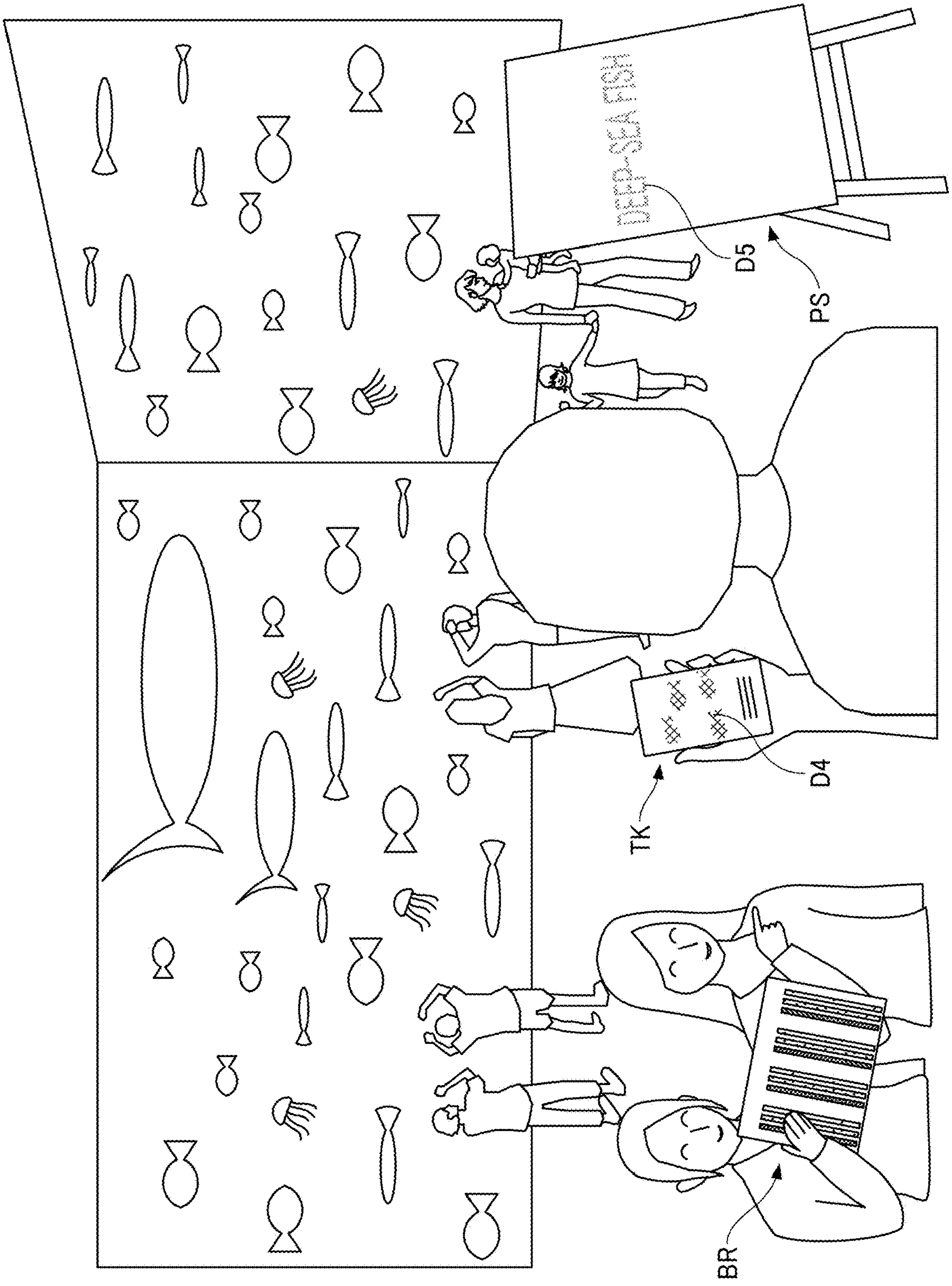
FIG. 13 is a diagram illustrating the use of printed materials produced by a copier according to an embodiment of the present disclosure.

Referring to FIG. 13, a description is given of performances with the brochure BR, the ticket TK, and the poster PS according to the present embodiment.

FIG. 13 is a diagram illustrating the use of the brochure BR, the ticket TK, and the poster PS, according to the present embodiment.

In the example illustrated in FIG. 13, the brochure BR is a booklet for explaining an aquarium, the ticket TK is an admission ticket to the aquarium, and the poster PS is a large piece of paper explaining living things displayed in each exhibition room of the aquarium. On each of the brochure BR, the ticket TK, and the poster PS, an invisible color image is printed separately from a visible color image formed by a visible color toner such as the K toner. Another invisible color image including, for example, numbers, characters, a QR code®, or a barcode may be printed on the ticket TK to confirm the authenticity of the ticket TK.

Specifically. FIG. 13 illustrates an exhibition room of the aquarium. In this exhibition room, living creatures are exhibited as exhibits such as coral, deep-sea fish, or jellyfish that fluoresce in response to the light emitted by the black light. The exhibition room is kept as dark as possible to indicate that the exhibition room is in the sea. On the other hand, the entire exhibition room is illuminated by a black light so that the exhibits luminesce (fluoresce). Since the black light does not cause things or living creatures that do not contain a fluorescent material such as a fluorescent agent to emit light, the black light does not brighten the surroundings unlike, for example, a fluorescent lamp. For this reason, the black light can respond to a demand for making only a specific object (for example, an exhibit and a reading object related to the exhibit) visible while making a space representing the inside of the sea, such as the exhibition room, as dark as possible.

When visitors enter the exhibition room, the invisible full-color image D4 appears in, for example, a portion where nothing appears to be drawn under visible light until the visitors enter the exhibition room, a portion where something appears to be drawn but it is difficult to clearly see what is drawn, or a portion where another visible color image is drawn, on each of the tickets TK held by the visitors to the aquarium. In the example illustrated in FIG. 13, the invisible full-color image D4 includes an image of fish that is the same as the fish swimming in a water tank (aquarium) placed in the exhibition room. Those performances surprise the visitors who have the tickets TK and allows the visitors to share an extraordinary experience or enhances the sense of unity of the visitors through the common experience. The same applies to the performances delivered with invisible images printed on the brochures BR held by the visitors to the aquarium.

When the poster PS that is stuck to the standing signboard placed in the exhibition room is illuminated by the black light, the invisible characters D5 appear on the poster PS. In the example illustrated in FIG. 13, the invisible characters D5 indicate "deep-sea fish" as a type of fish swimming in the aquarium. Those performances allow the visitors to read the characters D5 in the dark exhibition room and obtain information on the living creatures in the aquarium.

Such performances can be delivered in a place other than an aquarium, such as a concert hall, an event hall, a museum, or an amusement park, regardless of whether the place is indoors or outdoors, provided that a given light environment is attained.

Performances can be also delivered with a printed material other than the printed materials held by the visitors to the place where the given light environment is attained, such as the distributed tickets TK or brochures BR, or the printed material placed in the place where the given light environment is attained, such as the poster PS stuck to a standing signboard. For example, performances can be delivered with a printed material such as a label attachable to a carrier bag or clothes.

Figure 14:
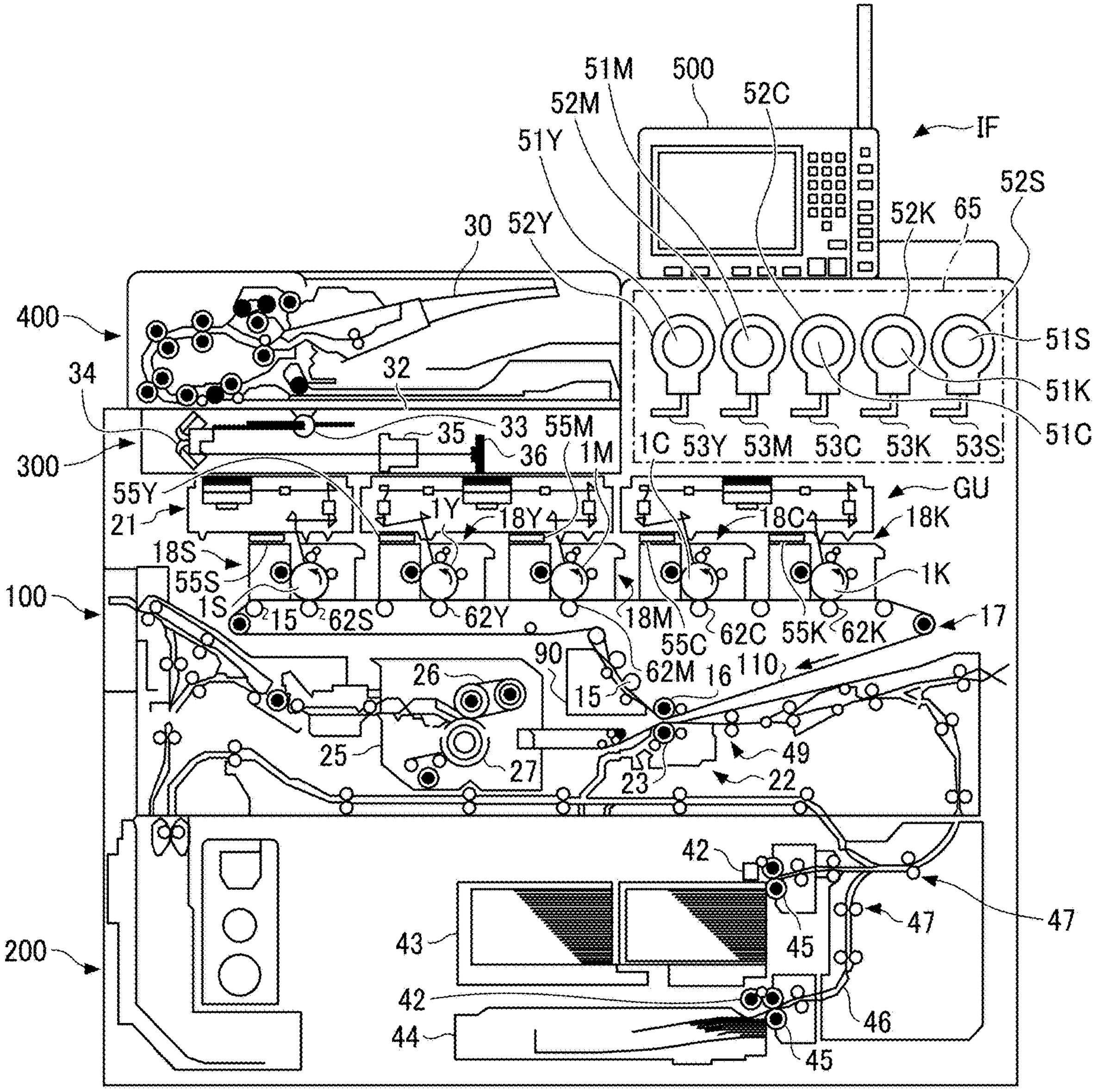
FIG. 14 is a schematic diagram illustrating a configuration of a copier according to another embodiment of the present disclosure.
Figure 15:
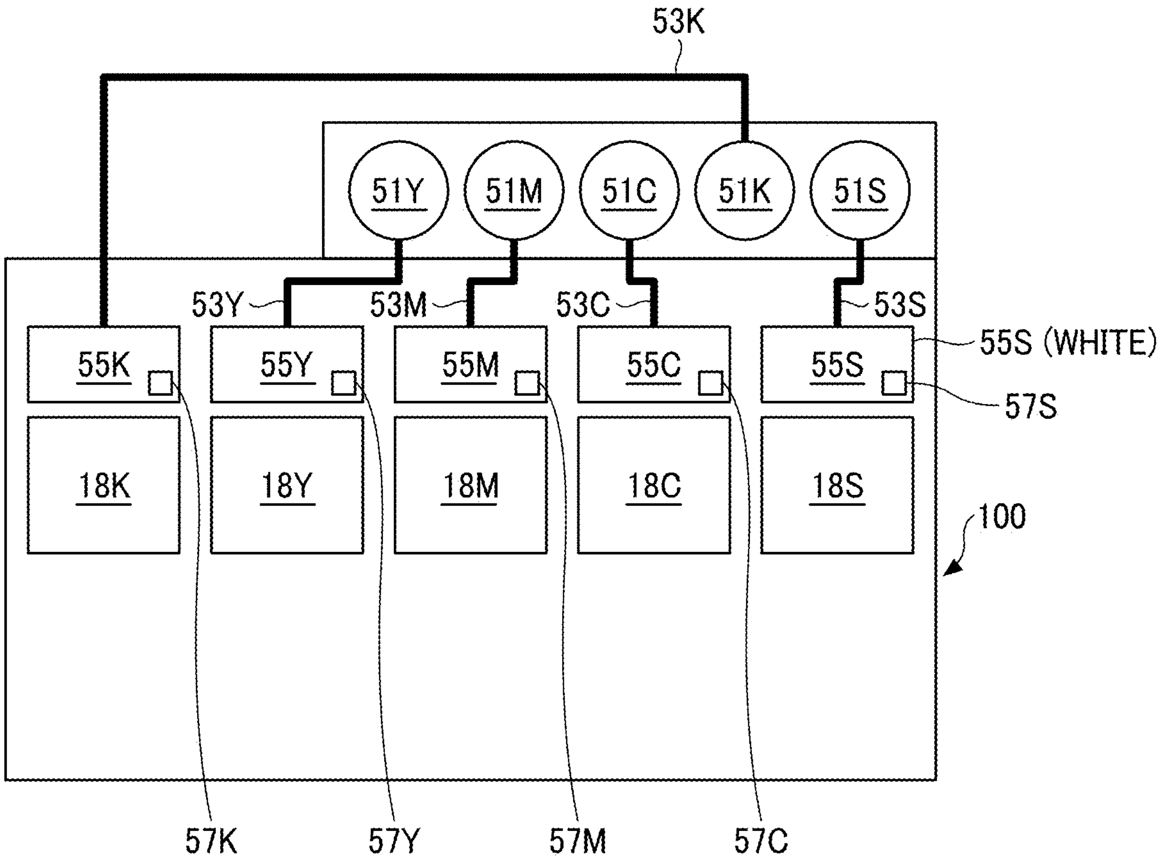
FIG. 15 is a schematic diagram illustrating an arrangement of developing stations, pre-supply reservoirs, and toner bottles in the copier of FIG. 14.

Referring to FIGS. 14 and 15, a description is given below of a copier according to another embodiment of the present disclosure.

FIG. 14 is a schematic diagram illustrating a configuration of the image forming apparatus IF as a copier according to another embodiment of the present disclosure. FIG. 14 corresponds to FIG. 2.

FIG. 15 is a schematic diagram illustrating an arrangement of the developing stations 18, the pre-supply reservoirs 55, and the toner bottles 51 in the image forming apparatus IF of FIG. 14. FIG. 15 corresponds to FIG. 10.

The copier illustrated in FIG. 14 is different from the copier illustrated in FIG. 2 in that the developing stations 18, the pre-supply reservoirs 55, and the toner bottles 51 for the visible color toners can be replaced with the developing stations 18, the pre-supply reservoirs 55, and the toner bottles 51 for the invisible color toners. The copier illustrated in FIG. 14 is otherwise the same as the copier illustrated in FIG. 2.

In the present embodiment illustrated in FIG. 14, the printer 100 includes the image forming unit GU. The image forming unit GU includes five developing stations 18S, 18Y, 18M, 18C, and 18K that form images in colors of special color (S), yellow (Y), magenta (M), cyan (C), and black (K) as a key plate, respectively. Suffixes S, Y. M. C. and K appended to the numeral "18" of reference signs 18S, 18Y, 18M, 18C, and 18K indicate that the developing stations 18S, 18Y, 18M, 18C, and 18K are components for the colors of special color, yellow, magenta, cyan, and black, respectively. The same applies to other reference signs used in the following description. In the following description, S, Y, M, C, and K may denote the colors of special color, yellow, magenta, cyan, and black, respectively. To simplify the description and the drawings, the suffixes S, Y, M, C, and K may be omitted unless otherwise required. The special color is a generic term for any color different from the colors of yellow, magenta, cyan, and black.

Yellow refers to a yellow color visible under visible light. Magenta refers to a magenta color visible under visible light. Cyan refers to a cyan color visible under visible light. The printer 100 illustrated in FIG. 14 superimposes the colors of yellow, magenta, and cyan one atop another, to represent a desired visible color, which can be visually recognized under visible light.

A yellow image is formed with a yellow toner. A magenta image is formed with a magenta toner. A cyan image is formed with a cyan toner. In the following description, the yellow toner, the magenta toner, and the cyan toner may be referred to as "Y toner." "M toner," and "C toner," respectively. An image of a visible color other than the colors of yellow, magenta, and cyan is formed with at least two visible color toners of the Y toner, the M toner, and the C toner superimposed one atop another. A special-color image is formed with the S toner. A black image is formed with the K toner. In the present embodiment, the visible color toner is a polymerized toner having a fixing temperature lower than that of a pulverized toner. Alternatively, the visible color toner may be a pulverized toner.

Specifically, in the copier illustrated in FIG. 14, the developing station 18Y is placed at the second unit position from the left where the developing station 18G is placed in FIG. 2. The developing station 18M is placed at the third unit position from the left where the developing station 18R is placed in FIG. 2. The developing station 18C is placed at the fourth unit position from the left where the developing station 18B is placed in FIG. 2. In other words, in the copier illustrated in FIG. 14, the components related to the three visible colors (i.e., the toner bottles 51Y, 51M, and 51C, the bottle drivers 52Y, 52M, and 52C, the transfer tubes 53Y, 53M, and 53C, the suction pumps 54Y, 54M, and 54C, and the pre-supply reservoirs 55Y, 55M, and 55C) and the components related to the three invisible colors (i.e., the toner bottles 51G, 51R, and 51B, the bottle drivers 52G, 52R, and 52B, the transfer tubes 53G, 53R, and 53B, the suction pumps 54G, 54R, and 54B, and the pre-supply reservoirs 55G. 55R, and 55B) are replaced with each other. In the present embodiment illustrated in FIGS. 14 and 15, the transfer tubes 53 are cleaned when the invisible color toners and the visible color toners are replaced with each other. In other words, the transfer tubes 53 are shared by the invisible color toners and the visible color toners. In the present embodiment illustrated in FIGS. 14 and 15, the bottle drivers 52, the suction pumps 54, and the pre-supply reservoirs 55 are replaced when the invisible color toners and the visible color toners are replaced with each other. Alternatively, the bottle drivers 52, the suction pumps 54, and the pre-supply reservoirs 55 may be cleaned like the transfer tubes 53. In other words, one or more of the bottle driver 52, the suction pump 54, and the pre-supply reservoir 55 may be shared by the invisible color toner and the visible color toner.

In the present embodiment illustrated in FIGS. 14 and 15, the pre-supply reservoirs 55S, 55Y, 55M, 55C, and 55K for S. Y, M, C, and K are attachable to and detachable from the main body of the printer 100 with simple operation by an operator. On the other hand, the pre-supply reservoirs 55G, 55R, and 55B for G, R, and B, which the pre-supply reservoirs 55Y, 55M, and 55C for Y, M, and C can be replaced with, are also attachable to and detachable from the main body of the printer 100 with simple operation by the operator.

The DIP switch boards 57S, 57Y, 57M, 57C, 57K, 57G, 57R, and 57B serving as the transmitting means are fixed to the pre-supply reservoirs 55S, 55Y, 55M, 55C, 55K, 55G, 55R, and 55B for S, Y, M, C, K, G, R, and B, respectively. The DIP switch boards 57S, 57Y, 57M, 57C, 57K, 57G, 57R, and 57B have the same configuration as the DIP switch board 57 described above with reference to FIG. 5A (FIG. 5).

Figure 16:
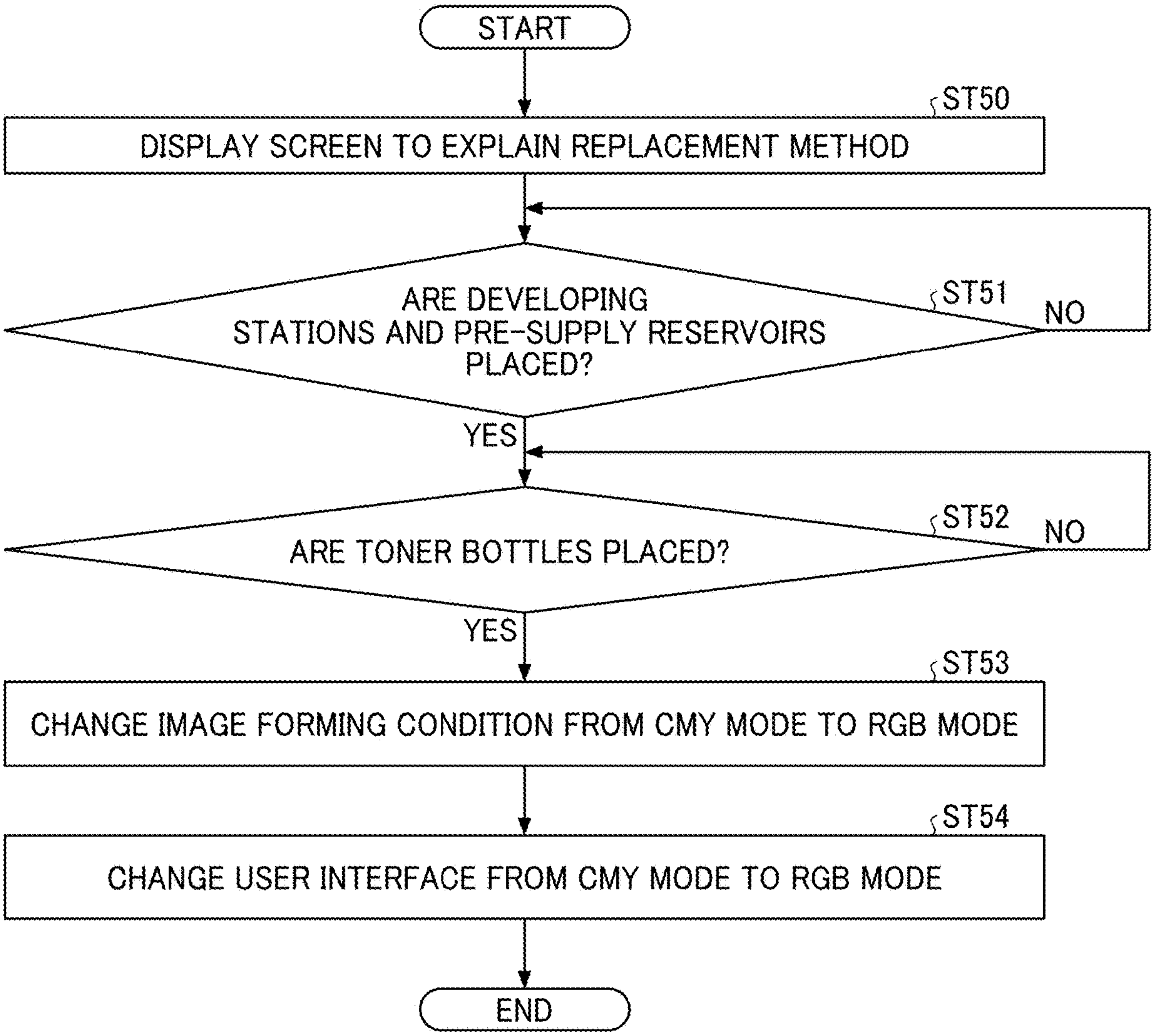
FIG. 16 is a flowchart illustrating a process performed by a copier according to an embodiment of the present disclosure.

Referring to FIG. 16, a description is given below of a color replacing process for replacing the visible color toners in the copier illustrated in FIG. 14 with the invisible color toners.

FIG. 16 is a flowchart illustrating the color replacing process performed by the copier according to the present embodiment.

Although the following description with reference to FIG. 16 relates to the process for replacing the visible color toners with the invisible color toners, the process is similarly applied to a process for replacing the invisible color toners with the visible color toners.

An operator (worker) of the copier presses a color change key on the control panel 500 to start the color replacing process.

When detecting that the color change key is pressed, in step ST50, the main controller 80 displays, on the LCD, a screen to explain a replacement method indicating information on the color replacing procedure.

The worker performs the work according to the explanation displayed on the LCD. Specifically, the worker removes the transfer tubes 53Y, 53M, and 53C for the visible colors from the copier and cleans the transfer tubes 53Y, 53M, and 53C. In the following description, the cleaned transfer tubes 53Y, 53M, and 53C for the visible colors are used as the transfer tubes 53G, 53R, and 53B for the invisible colors.

After cleaning the transfer tubes 53Y, 53M, and 53C, the worker replaces the developing stations 18Y, 18M, and 18C for the visible colors with the developing stations 18G, 18R, and 18B for the invisible colors. The worker also replaces the pre-supply reservoirs 55Y. 55M, and 55C for the visible colors with the pre-supply reservoirs 55G, 55R, and 55B for the invisible colors.

Specifically, the worker removes the developing stations 18Y, 18M, and 18C for the visible colors and the pre-supply reservoirs 55Y, 55M, and 55C for the visible colors from the respective toner supply devices, and then attaches the developing stations 18G, 18R, and 18B for the invisible colors and the pre-supply reservoirs 55G, 55R, and 55B for the invisible colors to the respective toner supply devices. After attaching the developing stations 18G, 18R, and 18B and the pre-supply reservoirs 55G, 55R, and 55B, the worker attaches the cleaned transfer tubes 53G, 53R, and 53B for the invisible colors to the pre-supply reservoirs 55G, 55R, and 55B for the invisible colors attached to the respective toner supply devices.

After displaying, on the LCD, the screen to explain the replacement method, in step ST51, the main controller 80 determines whether appropriate developing stations (the developing stations 18G, 18R, and 18B for the invisible colors) and appropriate pre-supply reservoirs (the pre-supply reservoirs 55G, 55R, and 55B for the invisible colors) are placed. In the copier illustrated in FIG. 14, when detecting that the developing station 18G is placed at the unit position of the developing station 18Y, the main controller 80 reads the color information from the data memory of the toner concentration sensor 4*e*. When the color information is color information of G, the main controller 80 determines that the appropriate developing station (i.e., the developing station 18G) is placed (YES in step ST51). By contrast, when the color information is not the color information of G, the main controller 80 determines that an inappropriate developing station (i.e., a developing station other than the developing station 18G) is placed (NO in step ST51). In this case, the main controller 80 may display, on the LCD, a message notifying the worker that an inappropriate developing station is placed. In the example illustrated in FIG. 16, the main controller 80 repeats the determination of step S51 until the main controller 80 determines that the appropriate developing station is placed. The same applies to the developing stations 18R and 18B.

In the copier illustrated in FIG. 14, the main controller 80 determines whether the appropriate pre-supply reservoirs (i.e., the pre-supply reservoirs 55G, 55R, and 55B) are placed, based on the outputs of the DIP switch boards 57G, 57R, and 57B fixed to the pre-supply reservoirs 55G, 55R, and 55B for the invisible colors, respectively. When determining that an inappropriate pre-supply reservoir is placed, the main controller 80 may display, on the LCD, a message notifying the worker that an inappropriate pre-supply reservoir is placed. In the example illustrated in FIG. 16, the main controller 80 repeats the determination of step ST51 until the main controller 80 determines that the appropriate pre-supply reservoirs are placed.

After determining that the developing stations 18G, 18R, and 18B for the invisible colors and the pre-supply reservoirs 55G, 55R, and 55B for the invisible colors are placed (YES in step ST51), in step ST52, the main controller 80 determines whether appropriate toner bottles (i.e., the toner bottles 51G, 51R, and 51B for the invisible colors) are placed. Prior to this determination, the main controller 80 may display, on the LCD, a message prompting the worker to replace the toner bottles.

In response to the message displayed on the LCD, the worker replaces the toner bottles 51Y, 51M, and 51C for the visible colors with the toner bottles 51G, 51R, and 51B for the invisible colors.

In the copier illustrated in FIG. 14, the main controller 80 determines whether the appropriate toner bottles (i.e., the toner bottles 51G, 51R, and 51B for the invisible colors) are placed, based on the color information of toners acquired through wireless communication between the bottle RFIDs 51*a* and the bottle communication circuits 52*a*.

For example, in a case where a toner bottle other than the toner bottle 51G is placed at a position where the toner bottle 51Y has been placed, the main controller 80 may determine that the appropriate toner bottle is not placed (NO in step ST52) and display, on the LCD, a message notifying the worker that an inappropriate toner bottle is placed. The same applies to a case where a toner bottle other than the toner bottle 51R is placed at a position where the toner bottle 51M has been placed and a case where a toner bottle other than the toner bottle 51B is placed at a position where the toner bottle 51C has been placed. In the example illustrated in FIG. 16, the main controller 80 repeats the determination of step S52 until the main controller 80 determines that the appropriate toner bottles are placed. In other words, the main controller 80 does not start the operation of the copier until the main controller 80 determines that the appropriate toner bottles are placed. Thus, the main controller 80 prevents the copier from operating with an inappropriate toner bottle placed.

When determining that the appropriate toner bottles (i.e., the toner bottles 51G, 51R, and 51B for the invisible colors) are placed (YES in step ST52), in step ST53, the main controller 80 changes the image forming condition from an image forming condition in a CMY mode to an image forming condition in an RGB mode.

The CMY mode is an operation mode used when a visible full-color image is formed on a print medium with visible color toners. On the other hand, the RGB mode is an operation mode used when an invisible full-color image is formed on a print medium with invisible color toners. The image forming condition is, for example, a combination of parameters related to image formation, such as parameters related to process control, transfer bias control, and temperature control. In the example illustrated in FIG. 16, the main controller 80 stores, in the flash memory 80*b*, a combination of various parameters suitable for forming a visible color image as a rewritable image forming condition in the CMY mode. On the other hand, the main controller 80 stores, in the flash memory 80*b*, a combination of various parameters suitable for forming an invisible color image as a rewritable image forming condition in the RGB mode. When determining that the appropriate toner bottles (i.e., the toner bottles 51G. 51R, and 51B for the invisible colors) are placed, the main controller 80 reads the image forming condition in the RGB mode (i.e., the combination of various parameters) from the flash memory 80*b* and overwrites the current image forming condition (the image forming condition in the YMC mode) stored in, for example, the RAM 80*c* with the read image forming condition (i.e., the image forming condition in the RGB mode).

In the process control in the RGB mode in the example illustrated in FIG. 16, a target amount of adhered toner (a target value of the amount of toner adhering to a print medium) is set for each of the R toner, the G toner, and the B toner with a look-up table (LUT) used when the clear toner is employed as the S toner. In other words, unlike the target amount of adhered toner for each of the C toner, the M toner, and the Y toner, the target amount of adhered toner for each of the R toner, the G toner, and the B toner is set to be the same as a target amount of adhered clear toner.

In the process control in the RGB mode, since the physical property value of the toner is different between the invisible color toner and the visible color toner, a target development y parameter in the RGB mode is set to be different from a target development y parameter in the CMY mode. The target development y parameter is a target value of the developing capability. The target development y parameter is adjusted based on, for example, the physical property value of the toner, the physical property value of the printing medium, or the arrangement of the developing stations 18.

In a process control in the RGB mode, since the toner shape is different between the invisible color toner (pulverized toner) and the visible color toner (polymerized toner), the parameters for detection and design of the amount of adhered toner in the RGB mode, such as a color difference correction coefficient and a correction coefficient for calculation of the amount of adhered toner, are set to be different from the parameters for detection and design of the amount of adhered toner in the CMY mode. The parameter for detection and design of the amount of adhered toner is a parameter representing a light reflection characteristic.

In the process control in the RGB mode, the upper and lower limits of the toner concentration and the upper and lower limits of the developing potential in the RGB mode are set to be different from the upper and lower limits of the toner concentration and the upper and lower limits of the developing potential in the CMY mode, respectively. This is because the invisible color toner and the visible color toner are different from each other in, for example, the toner concentration when the toner adheres to the printing medium, the toner concentration when the toner scatters, and the threshold of the developing potential.

In the process control in the RGB mode, since the conveyance performance of toner is different between the invisible color toner (pulverized toner) and the visible color toner (polymerized toner), a toner supply capability parameter in the RGB mode is set to be different from the toner supply capability parameter in the CMY mode. The toner supply capability parameter includes a driving time as a time for driving a device that conveys the toner. The amount of toner that can be conveyed in a given driving time is different between the invisible color toner (pulverized toner) and the visible color toner (polymerized toner).

In the process control in the RGB mode, since the bulk density of toner is different between the invisible color toner (pulverized toner) and the visible color toner (polymerized toner), a bulk density correction parameter in the RGB mode is set to be different from the bulk density correction parameter in the CMY mode. The bulk density correction parameter is a parameter for correcting the sense of bulk density (the sensitivity of deviation in the detection of toner concentration) that changes depending on the environment or time.

In a transfer bias control in the RGB mode, a transfer voltage parameter in the RGB mode is set to be different from the transfer voltage parameter in the CMY mode, to appropriately control, for example, the voltage and the current to be applied at the time of transfer. This is because the invisible color toner (pulverized toner) and the visible color toner (polymerized toner) are different from each other in, for example, the electric-charge amount of toner, the transfer efficiency at the time of transfer from the photoconductor to the transfer belt, and the transfer efficiency at the time of transfer from the transfer belt to the printing medium.

In a fixing temperature control in the RGB mode, a fixing temperature parameter in the RGB mode is set to be different from the fixing temperature parameter in the CMY mode. This is because the invisible color toner (pulverized toner) and the visible color toner (polymerized toner) are different from each other in, for example, the viscoelasticity and fixing characteristics of toner. For example, the invisible color toner (pulverized toner) has a fixing temperature higher than that of the visible color toner (polymerized toner). For this reason, in the fixing temperature control in the RGB mode, the printing speed in the RGB mode may be set to be lower than the printing speed in the CMY mode, to achieve the amount of heat to be given to the invisible color toner at the fixing nip.

Specifically, the main controller 80 controls a heating time during which the fixing belt 26 is heated by a heat source (heater) disposed inside a roller that contacts the fixing belt 26, to conduct appropriate heat to the toner on the print medium via the fixing belt 26. In other words, in the copier of FIG. 14, the toner is melted and fixed to a print medium under heat and pressure while the print medium is sandwiched at the fixing nip between the fixing belt 26 and the pressure roller 27.

In a sheet setting control in the RGB mode, a sheet setting parameter in the RGB mode is set to be different from the sheet setting parameter in the CMY mode. Specifically, the sheet setting parameter in the RGB mode is set to be the same as the sheet setting parameter employed when the clear toner is used. This is because the copier illustrated in FIG. 14 employs the invisible color toner that is generated with the clear toner as a base and applies the same transfer and fixing conditions for the invisible color toner as those of the clear toner. Alternatively, the sheet setting parameter in the RGB mode may be changed, depending on, for example, the sheet type, to a recommended setting for each sheet type, with the sheet setting parameter for the clear toner set as an initial value of the sheet setting parameter in the RGB mode. Examples of sheet types include, but are not limited to, plain paper, coated paper (for example, glossy paper and matte paper), and metallic paper. The plain paper may be further classified into a plurality of types based on the difference in thickness or weight. The sheet setting parameter in the RGB mode may be set to achieve transfer and fixing conditions appropriate for the type of the plain paper.

In addition, when determining that the appropriate toner bottles (i.e., the toner bottles 51G, 51R, and 51B for the invisible colors) are placed (YES in step ST52), in step ST54, the main controller 80 changes a user interface for the CMY mode to the user interface for the RGB mode. In the example of FIG. 16, the main controller 80 changes a toner level indicator indicating the toner level (the amount of remaining toner) for the CMY mode displayed on the control panel 500 to the toner level indicator for the RGB mode.

Figure 17:
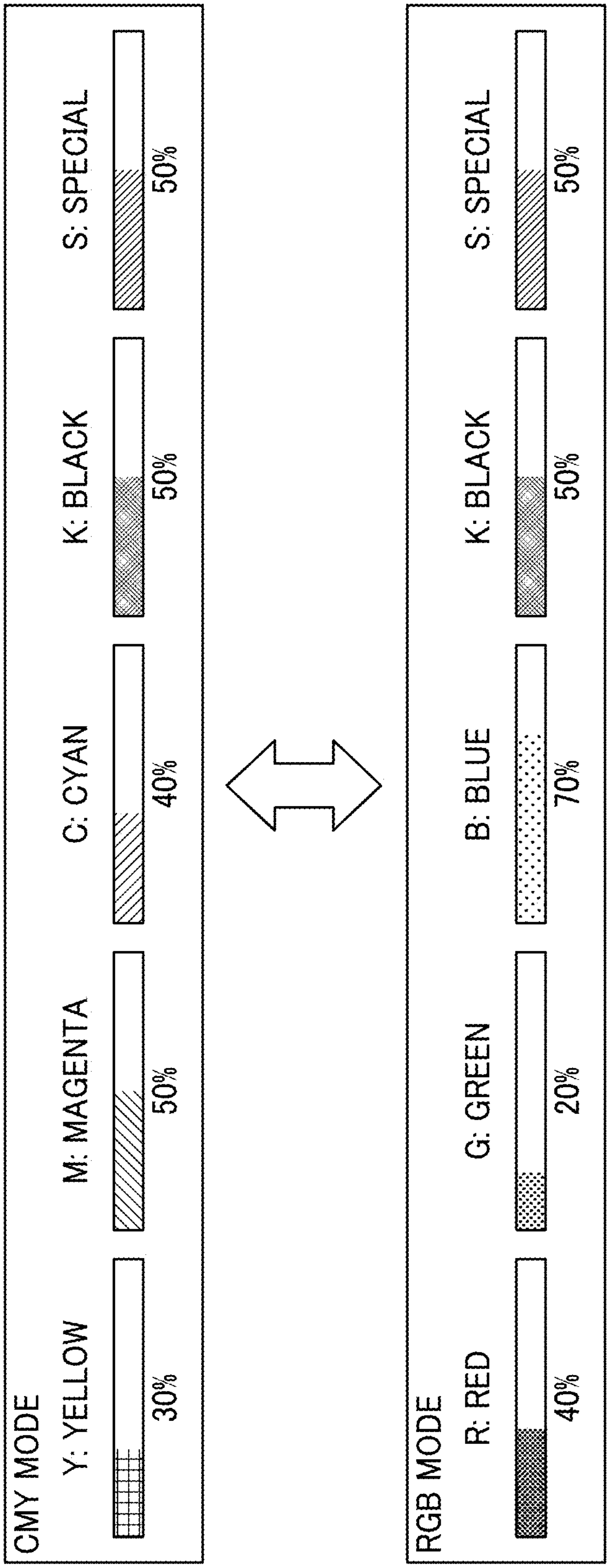
FIG. 17 is a diagram illustrating toner level indicators displayed on a control panel of a copier according to an embodiment of the present disclosure.

FIG. 17 is a diagram illustrating toner level indicators displayed on the control panel 500 according to the present embodiment.

Specifically, the upper part of FIG. 17 illustrates a toner level indicator for the CMY mode according to the present embodiment, whereas the lower part of FIG. 17 illustrates a toner level indicator for the RGB mode according to the present embodiment.

When determining that the toner bottles 51G, 51R, and 51B for the invisible colors are placed, the main controller 80 changes the toner level indicator for the CMY mode illustrated in the upper part of FIG. 17 to the toner level indicator for the RGB mode illustrated in the lower part of FIG. 17. In the example illustrated in FIG. 17, the laterally elongated bar graphs each representing the toner level for a color are aligned in the lateral direction. Alternatively, the laterally elongated bar graphs may be aligned in the vertical direction. In the example illustrated in FIG. 17, the toner level for each color is indicated by the bar graph meter and the percentage. Alternatively, the bar graph meter or the percentage may be omitted.

When image data of an invisible color image is input, the main controller 80 converts the image data into input data for the developing station 18 and irradiates the surface of the photoconductor 1 with laser light based on the input data to form an electrostatic latent image. The electrostatic latent image formed on the surface of the photoconductor 1 is developed into a toner image by the developing device 4 serving as the developing means. The toner image formed on the photoconductor 1 is primarily transferred to the intermediate transfer belt 110. The toner image primarily transferred onto the intermediate transfer belt 110 is secondarily transferred onto a print medium at the secondary transfer nip. Thus, an invisible full-color image is formed on the print medium.

With the above-described configuration, in the copier illustrated in FIG. 14, the image forming conditions can be easily switched between the image forming condition in the CMY mode and the image forming condition in the RGB mode. Accordingly, the copier illustrated in FIG. 14 prevents an unfavorable situation in which an error in the detection of the amount of toner adhering to the intermediate transfer belt 110 hampers appropriate control of the amount of toner and causes, for example, color variation, generation of defective images, or malfunction of the copier. In addition, by detecting that the appropriate toner bottle 51 is placed at the appropriate position, the copier illustrated in FIG. 14 can prevent the toners from being superimposed in an inappropriate order and therefore prevents an undesirable color change of the full-color image formed.

As described above with reference to FIG. 2, the copier as an example of the image forming apparatus IF according to an embodiment of the present disclosure includes the image forming unit GU that includes the five developing stations 18S, 18G, 18R, 18B, and 18K, and the five developing containers (the toner bottles 51S, 51G, 51R, 51B, and 51K) attachable to and detachable from the five developing stations 18S, 18G, 18R, 18B, and 18K. The image forming unit GU forms an image on a print medium (the recording sheet SH) with toners contained in the five developing containers (the toner bottles 51S, 51G, 51R, 51B, and 51K), based on input image data. A first developing container (the toner bottle 51G), which is one of the five developing containers (the toner bottles 51S, 51G, 51R, 51B, and 51K), contains a first toner (the G toner, i.e., invisible green toner). A second developing container (the toner bottle 51R or the toner bottle 51B), which is another one of the five developing containers (the toner bottles 51S, 51G, 51R, 51 B. and 51K), contains a second toner (the R toner or the B toner) having a luminescence intensity under invisible light higher than that of the first toner (the G toner). The first toner (the G toner) and the second toner (the R toner or the B toner) are toners that form an image having a luminescence intensity under invisible light higher than under visible light. When superimposing the first toner (the G toner) and the second toner (the R toner or the B toner) one atop another on the print medium (the recording sheet SH), the image forming unit GU adheres the second toner (the R toner or the B toner) to the print medium (the recording sheet SH) before adhering the first toner (the G toner).

Specifically, the first developing container (the toner bottle 51G), which is one of the five developing containers (the toner bottles 51S. 51G, 51R. 51B, and 51K), contains the first toner (the G toner, i.e., invisible green toner), which is one of the toners that form an image having a higher visibility under invisible light than under visible light. The second developing container (the toner bottle 51R or toner bottle 51B), which is another one of the five developing containers (the toner bottles 51S, 51G, 51R, 51B, and 51K), contains the second toner (the R toner, i.e., invisible red toner, or the B toner, i.e., invisible blue toner), which is another one of the toners that form an image having a higher visibility under invisible light than under visible light. When superimposing the first toner (the G toner) and the second toner (the R toner or the B toner) one atop another on the print medium (the recording sheet SH), the image forming unit GU adheres the second toner (the R toner or the B toner) having a relatively high visibility under invisible light to the print medium (the recording sheet SH) before adhering the first toner (the G toner). The toner that forms an image having a higher visibility under invisible light than under visible light is an example of toner that forms an image having a higher luminescence intensity under invisible light than under visible light. In other words, an image having a higher visibility under invisible light than under visible light is formed with toner that forms an image having a higher luminescence intensity under invisible light than under visible light. The toner having a relatively low visibility under invisible light is an example of toner having a relatively low luminescence intensity under invisible light, whereas the toner having a relatively high visibility under invisible light is an example of toner having a relatively high luminescence intensity under invisible light. The toner that forms an image having a higher luminescence intensity under invisible light than under visible light may be a toner that forms text (text image) having a higher readability under invisible light than under visible light. The toner that forms an image having a higher visibility under invisible light than under visible light may be, for example, a toner that forms an image in a higher luminescent color under invisible light than under visible light in terms of, for example, conspicuity. In other words, the toner may have a luminescent color that changes depending on an excitation wavelength. For example, the conspicuity indicating the degree of attracting human attention is higher as the luminescent color is closer to a warm color and lower as the luminescent color is closer to a cold color.

With this configuration, the copier of the present embodiment enhances the color expressiveness as compared with a device that represents, with a single color, an image visible under a given light environment such as under invisible light. This is because the copier of the present embodiment can represent, with a plurality of colors, an image visible under the given light environment such as under invisible light. Accordingly, the copier can more efficiently or more accurately perform printing suitable for the light environment of a desired place than typical copiers. For example, the copier can create a situation in which, as illustrated in FIG. 13, the invisible full-color image D4 printed on an admission ticket (the ticket TK) held by a visitor emits light near a water tank irradiated with invisible light having a given wavelength in an aquarium. This is because the copier of the present embodiment can print the invisible full-color image D4 on the ticket TK. The ticket TK on which the invisible full-color image D4 is printed surprises the visitor to the aquarium and leaves a strong impression. This is because of performances in which, as soon as the visitor enters a specific area of the aquarium, a full-color image appears on a part of the tickets TK on which nothing has been drawn at the entrance of the aquarium.

Figure 18:
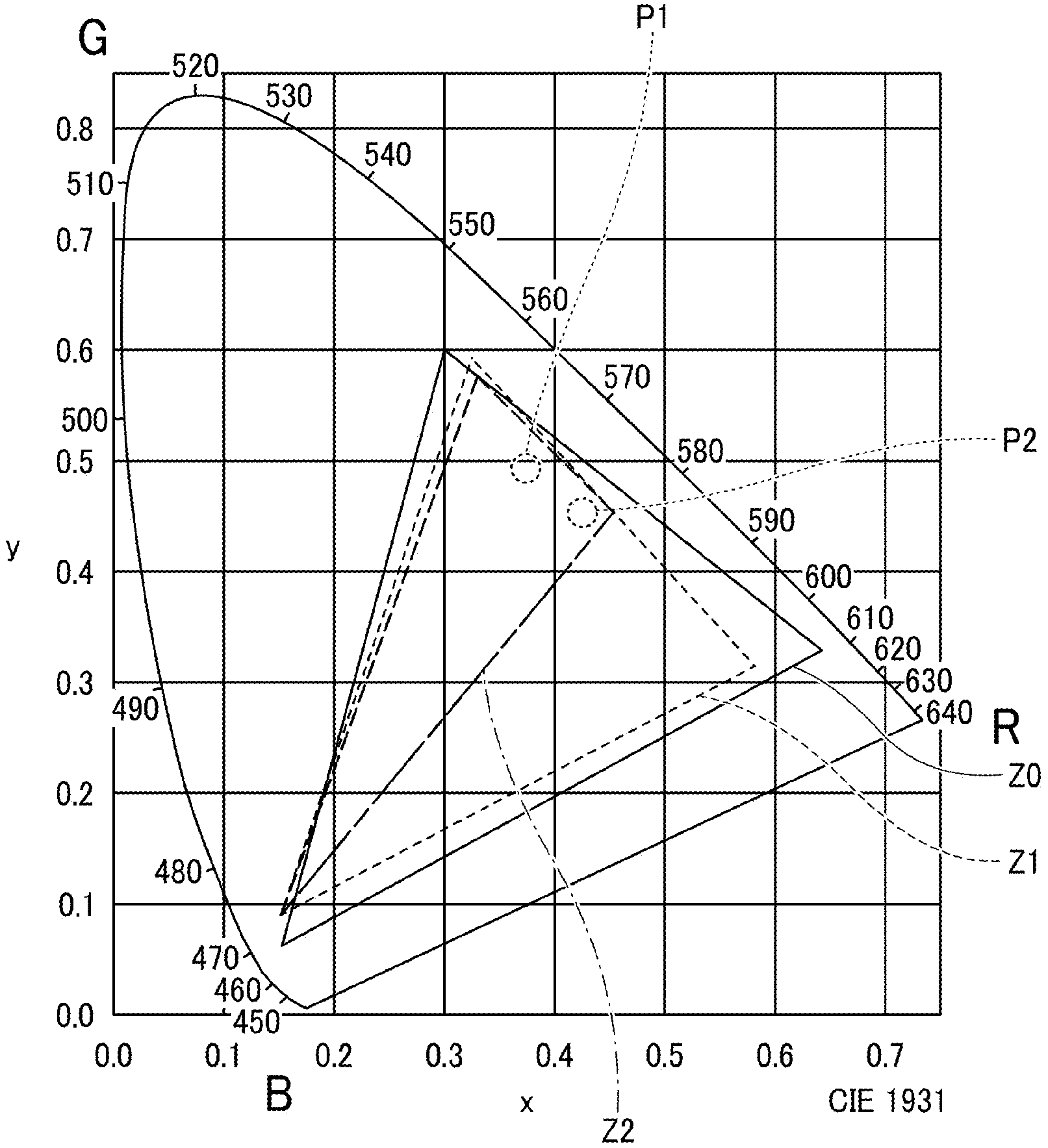
FIG. 18 is an x-y chromaticity diagram illustrating an effect of a copier according to an embodiment of the present disclosure.

Referring to FIG. 18, a detailed description is given below of an example of effects attained by the copier described above.

FIG. 18 is an x-y chromaticity diagram illustrating an example of effects attained by the copier described above.

In FIG. 18, a range surrounded by a solid line indicates a standard RGB (sRGB) color space Z0. A range surrounded by a broken line indicates a first color gamut Z1 attained by a first combination of the G toner, the R toner, and the B toner. A range surrounded by an alternate long and short dash line indicates a second color gamut Z2 attained by a second combination of the G toner, the R toner, and the B toner. In FIG. 18, characters "R," "G," and "B," which are added for the sake of clarity, indicate that, in the sRGB color space Z0 surrounded by the solid line, a position closer to the character "R" is closer to red, a position closer to the character "G" is closer to green, and a position closer to the character "B" is closer to blue. The same applies to the first color gamut Z1 and the second color gamut Z2. The colors in FIG. 18 are invisible colors that can be visually recognized under invisible light but are difficult to visually recognize under visible light).

Specifically, the second combination is lower in the luminescence intensity of the R toner and is weaker in the coloring of the invisible red color than the first combination. For this reason, the second color gamut Z2 is a range without a right portion, which is adjacent to red, of the first color gamut Z1. The luminescence intensity of the R toner is determined by, for example, the amount of raw material (transparent phosphor) contained in the R toner. The raw material (transparent phosphor) has a maximum amount and a minimum amount to form the R toner. In other words, when the amount of the raw material (transparent phosphor) is less than the minimum amount, the uniformity of the R toner deteriorates. As a result, the R toner does not uniformly emit light in the image. By contrast, when the amount of the raw material (transparent phosphor) exceeds the maximum amount, the R toner is not formed. As a result, an image cannot be formed. The same applies to the G toner and the B toner.

The copier described above employs the first combination of the G toner, the R toner, and the B toner to attain the first color gamut Z1. Specifically, the copier described above attains the first color gamut Z1, which is wider than the second color gamut Z2 attained by the second combination of the G toner, the R toner, and the B toner. Accordingly, the copier described above can represent almost all colors in the sRGB color space Z0 on the print medium (the recording sheet SH). Optionally, the copier described above may employ a combination of the G toner, the R toner, and the B toner to attain a narrower color gamut, such as the second combination of the G toner, the R toner, and the B toner, which attains the second color gamut Z2. In other words, the amount of the raw material (transparent phosphor) that determines the luminescence intensity of each of the G toner, the R toner, and the B toner may be increased or decreased, as necessary.

In the copier described above, the G toner is lower in visibility under invisible light than the R toner. For this reason, the image forming unit GU adheres the R toner to the print medium (the recording sheet SH) before adhering the G toner so that the G toner and the R toner are superimposed one atop another on the print medium (the recording sheet SH). Specifically, the developing station 18G is disposed at the unit position to the left of the developing station 18R. This configuration allows the image forming unit GU to output a desired color (invisible yellow) as a resultant color when superimposing the G toner and the R toner to represent the invisible yellow.

If the image forming unit GU adheres the R toner to the print medium (the recording sheet SH) after adhering the G toner, the image forming unit GU fails to produce a desired color (invisible yellow) and outputs, as a resultant color, a color closer to invisible red than to invisible yellow. A position P1 indicated by a broken-line circle in FIG. 18 indicates a position of a desired color (invisible yellow) in the sRGB color space Z0, whereas a position P2 indicated by a broken-line circle in FIG. 18 indicates a position of a resultant color in the sRGB color space Z0 when the R toner adheres to the print medium (the recording sheet SH) after the G toner adheres.

To prevent such deviation of a resultant color from a desired color (invisible yellow), the image forming unit GU of the copier described above adheres, when superimposing the G toner and the R toner one atop another on the recording sheet SH, the R toner having a relatively high visibility under invisible light to the recording sheet SH before adhering the G toner having a relatively low visibility under invisible light. The same applies to the case where the image forming unit GU superimposes the G toner and the B toner one atop another on the recording sheet SH and the case where the image forming unit GU superimposes the R toner and the B toner one atop another on the recording sheet SH. Such a configuration allows the copier described above to output a color as intended by the operator and represent an optimum color for the operator.

In addition, by forming the entire image with transfer from the intermediate transfer belt 110 to the recording sheet SH at one time, the copier described above can prevent the misalignment between the position where the first toner adheres and the position where the second toner adheres. In other words, by printing an invisible-color image (a color image that can be visually recognized under invisible light but is difficult to visually recognize under visible light) in one pass, the copier described above can enhance the quality of the invisible-color image as compared with a case where the invisible-color image is printed in a plurality of passes. The method of printing an invisible-color image in a plurality of passes includes, for example, a method of printing an invisible-color image in three passes while sequentially replacing the G toner, the R toner, and the B toner as the S toner. However, this method takes time and effort because, for example, the toner bottles 51 are replaced three times and the transfer tubes 53 are cleaned three times. In addition, in a case where the developing station 18S does not conform to the screen design and the invisible color toner is used as the S toner, an intended image (color) may not be obtained. The copier described above can address such an unfavorable situation.

In the embodiments described above, the first toner and the second toner are invisible color toners such as the G toner, the R toner, and the B toner. Alternatively, however, the first toner and the second toner may be visible color toners provided that an image can be formed with a higher visibility under invisible light than under visible light. In this case, the combination of the three invisible color toners may be replaced with, for example, a combination of a neon yellow toner, a neon pink toner, and a neon blue toner.

In the copier described above, when superimposing the first toner (the G toner) and the second toner (the R toner or the B toner) one atop another on a print medium (the recording sheet SH), the image forming unit GU may form an image such that the second toner (the R toner or the B toner) having a relatively high luminescence intensity under invisible light is closer to the print medium (the recording sheet SH) than the first toner (the G toner) having a relatively low luminescence intensity under invisible light.

This configuration allows the copier described above to bring the invisible color that is obtained by the superimposition of the first toner (the G toner) and the second toner (the R toner or the B toner) closer to a desired invisible color, as compared with a case where an image is formed such that the first toner (the G toner) is closer to the print medium (the recording sheet SH) than the second toner (the R toner or the B toner). In other words, the copier described above can attain the optimum color of the invisible color obtained by the superimposition of the first toner (the G toner) and the second toner (the R toner or the B toner).

This is because, when the first toner (the G toner) is closer to the print medium (the recording sheet SH) than the second toner (the R toner or the B toner), the first toner (the G toner) having a low luminescence intensity is positioned under the second toner (the R toner or the B toner) having a high luminescence intensity. The invisible color obtained by the superimposition of the second toner (the R toner or the B toner) on the first toner (the G toner) has an excessive influence (light emission or coloring) of the second toner (the R toner or the B toner) and an insufficient influence (light emission or coloring) of the first toner (the G toner). By contrast, when the second toner (the R toner or the B toner) is closer to the print medium (the recording sheet SH) than the first toner (the G toner), the first toner (the G toner) having a low luminescence intensity is positioned on the second toner (the R toner or the B toner) having a high luminescence intensity. In the invisible color obtained by the superimposition of the first toner (the G toner) on the second toner (the R toner or the B toner), neither the light emission by the first toner (the G toner) nor the light emission by the second toner (the R toner or the B toner) is excessive or insufficient.

In the copier described above, as illustrated in FIG. 2, the toners contained in the five developing containers (the toner bottles 51S. 51G, 51R, 51B, and 51K) may include an invisible red toner (the R toner) that forms a red image that can be visually recognized under invisible light but is difficult to visually recognize under visible light, an invisible green toner (the G toner) that forms a green image that can be visually recognized under invisible light but is difficult to visually recognize under visible light, and an invisible blue toner (the B toner) that can be visually recognized under invisible light but is difficult to visually recognize under visible light. In this case, the first toner may be the invisible green toner (the G toner) whereas the second toner may be the invisible red toner (the R toner) or the invisible blue toner (the B toner).

In the example illustrated in FIG. 2, the second toner is the invisible red toner (the R toner) whereas the invisible blue toner (the B toner) is a third toner having a luminescence intensity higher than that of the R toner. When the G toner and the B toner are superimposed one atop another in the copier described above, the B toner adheres to a print medium (the recording sheet SH) before the G toner adheres. When the R toner and the B toner are superimposed one atop another in the copier described above, the B toner adheres to the print medium (the recording sheet SH) before the R toner adheres.

This configuration allows the copier described above to form an invisible full-color image with high quality on a print medium (the recording sheet SH). In addition, by forming the invisible full-color image in one pass, the copier described above can prevent the misalignment between the positions of at least two invisible color toners superimposed.

As illustrated in FIGS. 5A and 5B (FIG. 5), the copier described above may include information acquiring units and a determining unit. The information acquiring units as information acquisition circuits (the bottle communication circuits 52*a*S, 52*a*G, 52*a*R, 52*a*B, and 52*a*K) acquire identification information from the developing containers (the toner bottles 51S. 51G. 51R, 51B, and 51K) attached to the developing stations 18 (the developing stations 18S, 18G, 18R, 18B, and 18K). Based on the identification information, the determining unit (the determination circuit 80*e*) determines whether the developing containers (the toner bottles 51S, 51G, 51R, 51B, and 51K) attached to the developing stations 18 (the developing stations 18S. 18G. 18R, 18B, and 18K) are appropriate as the developing containers to be attached to the developing stations 18.

For example, when the toner bottle 51R containing the R toner is attached to the developing station 18G, such a configuration allows the copier described above to output an alarm to address the situation in which the toner bottle 51R containing the R toner is erroneously attached to the developing station 18G.

In the copier illustrated in FIG. 14, the determining unit (the determination circuit 80*e*) may determine, based on the identification information, whether the toners contained in the five developing containers (the toner bottles 51) include visible color toners (the Y toner, the M toner, and the C toner) that form a color image visible under visible light. When the determining unit determines that the visible color toners (the Y toner, the M toner, and the C toner) are included, the image forming unit GU may form an image on a print medium (the recording sheet SH) under the image forming condition different from the image forming condition to be used when the determining unit determines that the visible color toners (the Y toner, the M toner, and the C toner) are not included. The image forming condition may include a combination of parameters related to image formation, such as parameters related to process control, transfer bias control, and temperature control.

This configuration allows the copier described above to prevent image formation with visible color toners under the image forming condition suitable for invisible color toners. In addition, the copier described above can prevent image formation with invisible color toners under the image forming condition suitable for visible color toners.

An image forming method according to an embodiment of the present disclosure includes a step of adhering the second toner (the R toner or the B toner) to a print medium (the recording sheet SH) and a step of superimposing the first toner (the G toner) on the second toner (the R toner or the B toner) adhered to the print medium (recording sheet SH).

Specifically, the image forming method according to an embodiment of the present disclosure includes a step of adhering the second toner (the R toner or the B toner) having a relatively high visibility under invisible light to the print medium (the recording sheet SH) and a step of superimposing the first toner (the G toner) having a relatively low visibility under invisible light on the second toner (the R toner or the B toner) adhered to the print medium (the recording sheet SH). For example, the image forming method according to an embodiment of the present disclosure includes a step of adhering the second toner (the R toner or the B toner) having a relatively high luminescence intensity under invisible light to the print medium (the recording sheet SH) and a step of superimposing the first toner (the G toner) having a relatively low luminescence intensity under invisible light on the second toner (the R toner or the B toner) adhered to the print medium (the recording sheet SH).

By superimposing a plurality of invisible color toners to form an invisible color image, the image forming method can enhance the expressiveness of the color of the image that is visible under a given light environment such as under irradiation of ultraviolet light. In addition, by superimposing the first toner (the G toner) on the second toner (the R toner or the B toner) on the recording sheet SH, the image forming method can prevent the second toner (the R toner or the B toner) from covering the first toner (the G toner) and adversely affecting the coloring of the first toner (the G toner).

A printed material (the ticket TK) according to an embodiment of the present disclosure includes an image formed by superimposing, on a print medium, the first toner (the G toner) on the second toner (the R toner or the B toner) having a higher luminescence intensity under invisible light than the first toner (the G toner).

Specifically, the printed material (the ticket TK) according to an embodiment of the present disclosure includes an image formed by superimposing, on the print medium (recording sheet SH), the first toner (the G toner) on the second toner (the R toner or the B toner). As described above, the first toner (the G toner) is one of the toners that form an image having a higher visibility under invisible light than under visible light. The second toner (the R toner or the B toner) is another one of the toners that form the image having a higher visibility under invisible light than under visible light. The second toner (the R toner or the B toner) has a higher visibility under invisible light than the first toner (the G toner). For example, the printed material (the ticket TK) according to an embodiment of the present disclosure includes an image formed by superimposing the first toner (the G toner) on the second toner (the R toner or the B toner) having a higher luminescence intensity under invisible light than the first toner (the G toner).

Since the printed material includes an invisible-color image printed with a plurality of invisible color toners superimposed, the invisible-color image can appear when the printed material is placed under a given light environment. For example, when the invisible-color image appears under a given light environment, the printed material can surprise or impress a person who has the printed material.

For example, an organizer of the facilities or events as described above can expect that the contents of a printed material such as a ticket, a leaflet, a brochure, or a poster strongly remain in the memory of the visitors in association with the impression or experience in the facilities or events caused by the performances that bring about the surprise or the impression described above.

A description is given below of some aspects of the present disclosure.

According to a first aspect, an image forming apparatus includes an image forming unit and a plurality of developing containers. The image forming unit includes a plurality of developing stations. The plurality of developing containers is attachable to and detachable from the plurality of developing stations. The image forming unit forms an image on a print medium with toners contained in the plurality of developing containers, based on input image data. A first developing container, which is one of the plurality of developing containers, contains a first toner. A second developing container, which is another one of the plurality of developing containers, contains a second toner having a higher luminescence intensity under invisible light than the first toner. The first toner and the second toner are toners that form an image having a higher luminescence intensity under the invisible light than under visible light. The image forming unit adheres the second toner to the print medium before adhering the first toner w % ben the image forming unit superimposes the first toner and the second toner one atop another on the print medium.

According to a second aspect, in the image forming apparatus of the first aspect, the image forming unit forms the image with the second toner closer to the print medium than the first toner when the image forming unit superimposes the first toner and the second toner one atop another on the print medium.

According to a third aspect, in the image forming apparatus of the first or second aspect, the toners contained in the plurality of developing containers include an invisible red toner that forms a red image having a higher luminescence intensity under the invisible light than under the visible light, an invisible green toner that forms a green image having a higher luminescence intensity under the invisible light than under the visible light, and an invisible blue toner that forms a blue image having a higher luminescence intensity under the invisible light than under the visible light. The first toner is the invisible green toner. The second toner is the invisible red toner or the invisible blue toner.

According to a fourth aspect, the image forming apparatus of any one of the first to third aspects further includes an information acquiring unit and a determining unit. The information acquiring unit acquires identification information from the plurality of developing containers attached to the plurality of developing stations. The determining unit determines, based on the identification information, whether the plurality of developing containers attached to the plurality of developing stations is appropriate as a plurality of developing containers to be attached to the plurality of developing stations.

According to a fifth aspect, in the image forming apparatus of the fourth aspect, the determining unit determines, based on the identification information, whether the toners contained in the plurality of developing containers include a visible color toner that forms a color image visible under the visible light. When the determining unit determines that the toners contained in the plurality of developing containers include the visible color toner, the image forming unit forms the image on the print medium under an image forming condition that is different from an image forming condition to be used when the determining unit determines that the toners contained in the plurality of developing containers do not include the visible color toner.

According to a sixth aspect, an image forming method is performed by an image forming apparatus that includes an image forming unit and a plurality of developing containers. The image forming unit includes a plurality of developing stations. The plurality of developing containers is attachable to and detachable from the plurality of developing stations. The image forming unit forms an image on a print medium with toners contained in the plurality of developing containers, based on input image data. A first developing container, which is one of the plurality of developing containers, contains a first toner. A second developing container, which is another one of the plurality of developing containers, contains a second toner having a higher luminescence intensity under invisible light than the first toner. The first toner and the second toner are toners that form an image having a higher luminescence intensity under the invisible light than under visible light. The image forming method includes a step of adhering the second toner to the print medium and a step of superimposing the first toner on the second toner adhered to the print medium.

According to a seventh aspect, in the image forming method of the sixth aspect, the second toner on which the first toner is superimposed is located closer to the print medium than the first toner.

According to an eighth aspect, in the image forming method of the sixth or seventh aspect, the toners contained in the plurality of developing containers include an invisible red toner that forms a red image having a higher luminescence intensity under the invisible light than under the visible light, an invisible green toner that forms a green image having a higher luminescence intensity under the invisible light than under the visible light, and an invisible blue toner that forms a blue image having a higher luminescence intensity under the invisible light than under the visible light. The first toner is the invisible green toner. The second toner is the invisible red toner or the invisible blue toner.

According to a ninth aspect, the image forming method of any one of the sixth to eighth aspects further includes a step of acquiring identification information from the plurality of developing containers attached to the plurality of developing stations and a step of determining, based on the identification information, whether the plurality of developing containers attached to the plurality of developing stations is appropriate as a plurality of developing containers to be attached to the plurality of developing stations.

According to a tenth aspect, the image forming method of the ninth aspect further includes a step of determining, based on the identification information, whether the toners contained in the plurality of developing containers include a visible color toner that forms a color image visible under the visible light, and a step of forming, based on a determination, in the step of determining, that the toners contained in the plurality of developing containers include the visible color toner, the image on the print medium under an image forming condition different from an image forming condition to be used based on a determination, in the step of determining, that the toners contained in the plurality of developing containers do not include the visible color toner.

According to an eleventh aspect, a printed material includes an image formed by superimposing, on a print medium, a first toner on a second toner having a higher luminescence intensity under invisible light than the first toner. The first toner and the second toner are toners that form an image having a higher luminescence intensity under the invisible light than under visible light.

According to an embodiment of the present disclosure, the expressiveness of the color of an image that is visible under a given light environment is enhanced.

The above-described embodiments are illustrative and do not limit the present invention. For example, the dimensions, materials, shapes, and relative arrangements of the components described above are illustrative and do not limit the scope of the present invention unless specifically indicated.

Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

an image forming unit including a plurality of developing stations to form an image on a print medium with toners, based on input image data; and a plurality of developing containers containing the toners, the plurality of developing containers being attachable to and detachable from the plurality of developing stations, the plurality of developing containers including:

a first developing container containing a first toner, the first toner being an invisible blue toner that forms a blue image having a higher luminescence intensity under invisible light than under visible light;

a second developing container containing a second toner having a higher luminescence intensity under the invisible light than the first toner, the second toner being an invisible red toner that forms a red image having a higher luminescence intensity under the invisible light than under the visible light; and a third developing container containing a third toner having a higher luminescence intensity under invisible light than the second toner, the third toner being an invisible green toner that forms a green image having a higher luminescence intensity under the invisible light than under the visible light, the first toner, the second toner, and the third toner being toners that form an image having a higher luminescence intensity under the invisible light than under the visible light, wherein the image forming unit adheres the first toner to the print medium before adhering the second toner and the image forming unit adheres the second toner to the first toner before adhering the third toner when the image forming unit superimposes the first toner, the second toner, and the third toner one atop another in this order on the print medium.

2. The image forming apparatus according to claim 1, further comprising:

an information acquisition circuit configured to acquire identification information from the plurality of developing containers attached to the plurality of developing stations; and a determination circuit configured to determine, based on the identification information, whether the plurality of developing containers attached to the plurality of developing stations is appropriate as the plurality of developing containers to be attached to the plurality of developing stations.

3. The image forming apparatus according to claim 2, wherein the determination circuit is configured to determine, based on the identification information, whether the toners contained in the plurality of developing containers include a visible color toner that forms a color image visible under the visible light, and wherein, when the determination circuit determines that the toners contained in the plurality of developing containers include the visible color toner, the image forming unit forms the image on the print medium under an image forming condition, the image forming condition being different from an image forming condition to be used when the determination circuit determines that the toners contained in the plurality of developing containers do not include the visible color toner.

4. An image forming method comprising:

adhering, to a print medium, a first toner contained in a first container of a plurality of containers attachable to and detachable from a plurality of developing stations of an image forming unit of an image forming apparatus, the image forming unit being configured to form an image on the print medium with toners contained in the plurality of containers;

superimposing, on the first toner adhered to the print medium, a second toner contained in a second container of the plurality of containers; and superimposing, on the second toner, a third toner contained in a third container of the plurality of containers such that the first, second, and third toners are adhered to the print medium in this order, the second toner having a higher luminescence intensity under invisible light than the first toner and third toner having a higher luminescence intensity under invisible light than the second toner, the first toner, the second toner, and the third toner being toners that form an image having a higher luminescence intensity under the invisible light than under visible light, wherein the first toner is an invisible blue toner that forms a blue image having a higher luminescence intensity under the invisible light than under the visible light; the second toner is an invisible red toner that forms a red image having a higher luminescence intensity under the invisible light than under the visible light; and the third toner is an invisible green toner that forms a green image having a higher luminescence intensity under the invisible light than under the visible light.

5. The image forming method according to claim 4, further comprising:

acquiring identification information from the plurality of developing containers attached to the plurality of developing stations; and determining, based on the identification information, whether the plurality of developing containers attached to the plurality of developing stations is appropriate as the plurality of developing containers to be attached to the plurality of developing stations.

6. The image forming method according to claim 5, further comprising:

determining, based on the identification information, whether the toners contained in the plurality of developing containers include a visible color toner that forms a color image visible under the visible light; and forming, when the determining determines that the toners contained in the plurality of developing containers include the visible color toner, the image on the print medium under an image forming condition different from an image forming condition to be used when the determining determines that the toners contained in the plurality of developing containers do not include the visible color toner.

7. A printed material comprising:

a print medium; and an image formed with a first toner, a second toner, and a third toner superimposed one atop another in this order on the print medium, wherein the second toner has a higher luminescence intensity under invisible light than the first toner on the print medium, wherein the third toner has a higher luminescence intensity under the invisible light than the second toner on the print medium, wherein the first toner, the second toner, and the third toner are toners that form an image having a higher luminescence intensity under the invisible light than under visible light, and wherein the first toner is an invisible blue toner that forms a blue image having a higher luminescence intensity under the invisible light than under the visible light, the second toner is an invisible red toner that forms a red image having a higher luminescence intensity under the invisible light than under the visible light, and the third toner is an invisible green toner that forms a green image having a higher luminescence intensity under the invisible light than under the visible light.

* * * * *